US012794044B2

(12) United States Patent
Onuki

(10) Patent No.: US 12,794,044 B2
(45) Date of Patent: Nov. 10, 2026

(54) ALTERNATING CURRENT GENERATION CIRCUIT AND TEMPERATURE RAISING DEVICE

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 917 days.

(21) Appl. No.: 18/118,759

(22) Filed: Mar. 8, 2023

(65) Prior Publication Data

US 2023/0318089 A1 Oct. 5, 2023

(30) Foreign Application Priority Data

Mar. 29, 2022 (JP) ................................. 2022-053496

(51) Int. Cl.
*B60L 58/18* (2019.01)
*B60L 58/27* (2019.01)
(Continued)

(52) U.S. Cl.
CPC ........... *H01M 10/657* (2015.04); *B60L 58/18* (2019.02); *B60L 58/27* (2019.02);
(Continued)

(58) Field of Classification Search
CPC ............. H01M 10/657; H01M 10/625; H01M 10/4264; H01M 2220/20; B60L 58/27; B60L 58/18
(Continued)

(56) References Cited

U.S. PATENT DOCUMENTS

2011/0248684 A1* 10/2011 Zhou ....................... B60L 53/00 320/137
2012/0274414 A1* 11/2012 Hung ........................ H03F 1/52 333/125

(Continued)

FOREIGN PATENT DOCUMENTS

CN 109565238 4/2019
CN 110316022 10/2019

(Continued)

OTHER PUBLICATIONS

Electronics Tutorials (https://www.electronics-tutorials.ws/accircuits/ac-inductance.html) (Year: 2020).*

(Continued)

*Primary Examiner* — Drew A Dunn
*Assistant Examiner* — Pamela J Jeppson
(74) *Attorney, Agent, or Firm* — Amin, Turocy & Watson, LLP

(57) ABSTRACT

An alternating current (AC) generation circuit includes a first capacitor having a first end connected to a positive electrode side of a power storage having an inductance component, a second capacitor having a second end connected to a negative electrode side of the power storage, a third capacitor having a second end connected to the negative electrode side of the power storage, a fourth capacitor having a first end connected to the positive electrode side of the power storage, a first switch having a first terminal connected to the first end of the first capacitor, a second switch having a second terminal connected to the second end of the first capacitor, a third switch having a second terminal connected to the second end of the third capacitor, a fourth switch having a first terminal connected to the first end of the third capacitor, a first inductor connected between the second terminal of the first switch and the first terminal of the fourth switch, and a second inductor connected between the (Continued)

second terminal of the second switch and the first terminal of the third switch.

11 Claims, 12 Drawing Sheets

(51) Int. Cl.
*H01M 10/42* (2006.01)
*H01M 10/625* (2014.01)
*H01M 10/657* (2014.01)

(52) U.S. Cl.
CPC ..... *H01M 10/4264* (2013.01); *H01M 10/625* (2015.04); *H01M 2220/20* (2013.01)

(58) Field of Classification Search
USPC .......................................................... 320/150
See application file for complete search history.

(56) References Cited

U.S. PATENT DOCUMENTS

| | | | | |
|---|---|---|---|---|
| 2019/0165666 | A1 | 5/2019 | Nishimoto et al. | |
| 2019/0305393 | A1* | 10/2019 | Oguma | H02J 7/1423 |
| 2021/0257919 | A1 | 8/2021 | Hayashi et al. | |
| 2022/0021045 | A1 | 1/2022 | Onuki | |
| 2022/0376624 | A1* | 11/2022 | Bae | H02M 3/1584 |

FOREIGN PATENT DOCUMENTS

| | | |
|---|---|---|
| CN | 212970155 | 4/2021 |
| CN | 113285603 | 8/2021 |
| CN | 113733986 | 12/2021 |
| EP | 2782235 | 9/2014 |
| JP | 2000-228231 | 8/2000 |
| JP | 5293820 | 9/2013 |
| JP | 2022-019201 | 1/2022 |
| KR | 19990047474 | 7/1999 |
| KR | 10-2021-0009936 | 1/2021 |

OTHER PUBLICATIONS

Japanese Notice of Allowance for Japanese Patent Application No. 2022-053496 mailed Dec. 12, 2023.

Chinese Office Action for Chinese Patent Application No. 202310209604.6 mailed Nov. 17, 2025.

Chinese Office Action for Chinese Patent Application No. 202310209604.6 mailed Apr. 28, 2026.

* cited by examiner

ALTERNATING CURRENT GENERATION CIRCUIT AND TEMPERATURE RAISING DEVICE

CROSS-REFERENCE TO RELATED APPLICATION

Priority is claimed on Japanese Patent Application No. 2022-053496, filed Mar. 29, 2022, the content of which is incorporated herein by reference.

BACKGROUND OF THE INVENTION

Field of the Invention

The present invention relates to an alternating current (AC) generation circuit and a temperature raising device.

Description of Related Art

Efforts are underway to reduce adverse effects on the global environment (for example, reduction of $NO_x$ and $SO_x$ and reduction of $CO_2$). Thus, in recent years, from the viewpoint of improving the global environment, for reduction of $CO_2$, there is growing interest in at least electric vehicles allowed to travel with electric motors driven by power supplied by batteries (secondary batteries) such as, for example, a hybrid electric vehicle (HEV) and a plug-in hybrid vehicle (PHEV). The use of a lithium-ion secondary battery is being considered as a battery for in-vehicle use. In these electric vehicles, it is important to fully bring out the performance of the secondary battery. It is known that the charging/discharging performance of a secondary battery deteriorates when the temperature at the time of use drops below an appropriate range. It is possible to limit the deterioration of the charging/discharging performance of the secondary battery by raising the temperature to a suitable temperature at the time of use.

In relation to this, for example, Japanese Patent No. 5293820 discloses technology related to a temperature raising device for raising the temperature of a secondary battery. In the temperature raising device disclosed in Japanese Patent No. 5293820, the temperature of the secondary battery is raised by positively generating a ripple current of a prescribed frequency of a frequency range in which an absolute value of impedance is relatively decreased in the secondary battery on the basis of frequency characteristics of impedance of the secondary battery.

SUMMARY OF THE INVENTION

However, in the conventional technology, it may not be possible to raise the temperature of the secondary battery efficiently.

The present invention has been made on the basis of the above recognition of the problems and an objective of the present invention is to provide an AC generation circuit and a temperature raising device capable of improving energy efficiency by raising the temperature of a secondary battery more efficiently.

An AC generation circuit and a temperature raising device according to the present invention adopt the following configurations.

(1): According to an aspect of the present invention, there is provided an AC generation circuit for raising the temperature of a power storage by generating an AC current based on electric power stored in the power storage having an inductance component, the AC generation circuit including: a first capacitor having a first end connected to a positive electrode side of the power storage; a second capacitor having a first end connected to a second end of the first capacitor and a second end connected to a negative electrode side of the power storage; a third capacitor having a second end connected to the negative electrode side of the power storage; a fourth capacitor having a second end connected to a first end of the third capacitor and a first end connected to the positive electrode side of the power storage; a first switch having a first terminal connected to the first end of the first capacitor; a second switch having a first terminal connected to a second terminal of the first switch and a second terminal connected to the second end of the first capacitor; a third switch having a second terminal connected to the second end of the third capacitor; a fourth switch having a second terminal connected to a first terminal of the third switch and a first terminal connected to the first end of the third capacitor; a first inductor connected between the second terminal of the first switch and the first terminal of the fourth switch; and a second inductor connected between the second terminal of the second switch and the first terminal of the third switch.

(2): In the above-described aspect (1), the inductance of the first inductor, the inductance of the second inductor, the capacitance of the first capacitor, the capacitance of the second capacitor, the capacitance of the third capacitor, and the capacitance of the fourth capacitor are adjusted so that an electric current waveform of the AC current is close to a waveform of a sinusoidal wave on the basis of a relational expression including the inductance component.

(3): In the above-described aspect (2), the inductance of the first inductor is the same as the inductance of the second inductor.

(4): In the above-described aspect (3), the capacitance of the first capacitor and the capacitance of the third capacitor are the same as a first capacitance.

(5): In the above-described aspect (4), the capacitance of the second capacitor and the capacitance of the fourth capacitor are the same as a second capacitance.

(6): In the above-described aspect (5), the second capacitance is less than capacitance that is twice the first capacitance.

(7): In the above-described aspect (5), the second capacitance is greater than capacitance that is three times the first capacitance.

(8): In the above-described aspect (5), the second capacitance is the same as the first capacitance.

(9): In the above-described aspect (1), the inductance component includes an inductance component provided in a wiring portion between the power storage and the AC generation circuit.

(10): In the above-described aspect (1), the first switch and the third switch are controlled to be in a conductive state or a non-conductive state in accordance with a first control signal, the second switch and the fourth switch are controlled to be in the conductive state or the non-conductive state in accordance with a second control signal, and a period of a first state in which the first control signal causes the first switch and the third switch to be in the conductive state does not overlap a period of a second state in which the second control signal causes the second switch and the fourth switch to be in the conductive state.

(11): In the above-described aspect (10), the power storage includes a first power storage and a second power storage connected in series with the first power storage, the AC generation circuit is connected to the first power storage, a second AC generation circuit having the same configuration as the AC generation circuit is connected to the second power storage, and the first control signal and the second control signal are input so that a prescribed phase difference is given between an AC current generated by the AC generation circuit and a second AC current that is an AC current generated by the second AC generation circuit.

(12): According to an aspect of the present invention, there is provided a temperature raising device including: the AC generation circuit according to the above-described aspect (11); and a controller configured to output the first control signal and the second control signal and alternately switch the state between the first state in which the first switch and the third switch are allowed to be in the non-conductive state and the second switch and the fourth switch are allowed to be in the conductive state and the second state in which the first switch and the third switch are allowed to be in the conductive state and the second switch and the fourth switch are allowed to be in the non-conductive state according to the first control signal and the second control signal.

According to the above-described aspects (1) to (12), it is possible to improve energy efficiency by raising the temperature of a secondary battery more efficiently.

DETAILED DESCRIPTION OF THE INVENTION

Hereinafter, embodiments of an AC generation circuit and a temperature raising device of the present invention will be described with reference to the drawings. As used throughout this disclosure, the singular forms “a,” “an,” and “the” include a plurality of references unless the context clearly dictates otherwise.

[Configuration of Vehicle]

Figure 1:
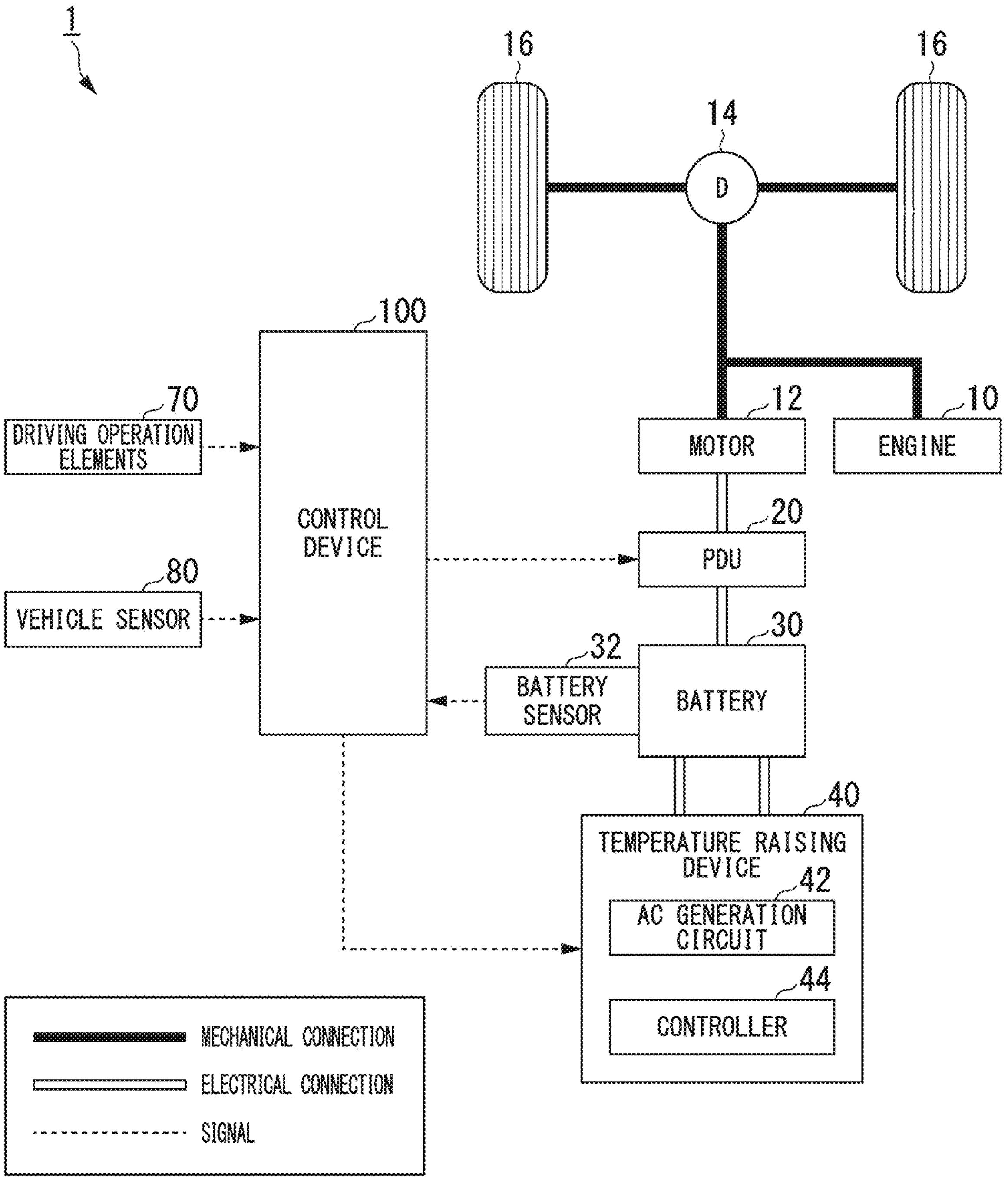
FIG. 1 is a diagram showing an example of a configuration of a vehicle in which a temperature raising device according to an embodiment is adopted.

FIG. 1 is a diagram showing an example of a configuration of a vehicle in which a temperature raising device according to an embodiment is adopted. A vehicle 1 is a hybrid electric vehicle (HEV) (hereinafter simply referred to as a “vehicle”) that travels by combining driving of an electric motor driven using electric power supplied from a battery (a secondary battery) for traveling and driving of an internal combustion engine using fuel as an energy source, such as, for example, a diesel engine or a gasoline engine. Vehicles to which the present invention is applied may be, for example, general vehicles such as four-wheeled vehicles, saddle-riding type two-wheeled vehicles, three-wheeled vehicles (including two front wheel and one rear wheel vehicles in addition to one front wheel and two rear wheel vehicles), and a vehicle that travels using an electric motor driven by power supplied from a battery for traveling such as an assisted bicycle. The vehicle 1 may be, for example, an electric vehicle (EV) that travels according to driving of only an electric motor.

The vehicle 1 includes, for example, an engine 10, a motor 12, a speed reducer 14, drive wheels 16, a power drive unit (PDU) 20, a battery 30, a battery sensor 32, a temperature raising device 40, driving operation elements 70, a vehicle sensor 80, and a control device 100.

The engine 10 is an internal combustion engine that outputs motive power by burning fuel, for example, such as light oil or gasoline, stored in a fuel tank (not shown) of the vehicle 1 and operating (rotating) the engine 10. The engine 10 is a reciprocating engine including, for example, a cylinder and a piston, an intake valve, an exhaust valve, a fuel injection device, an ignition plug, a conrod, a crankshaft, and the like. The engine 10 may be a rotary engine. The rotational power of the engine 10 is transferred to the speed reducer 14.

The motor 12 is an electrical rotating machine for traveling of the vehicle 1. The motor 12 is, for example, a three-phase AC motor. The rotor of the motor 12 is connected to the speed reducer 14. The motor 12 is driven (rotated) by electric power supplied from the battery 30 via the PDU 20. The rotational power of the motor 12 is transferred to the speed reducer 14. The motor 12 may operate as a regenerative brake using kinetic energy of the vehicle 1 during deceleration to generate electric power. The motor 12 may include an electric motor for power generation. The electric motor for power generation uses, for example, the rotational power output by the engine 10 to generate electric power.

The speed reducer 14 is, for example, a differential gear. The speed reducer 14 allows a driving force of the shaft to which the engine 10 and the motor 12 are connected, i.e., the rotational power of the engine 10 and the motor 12, to be transferred to the axle to which the drive wheels 16 are connected. The speed reducer 14 may include, for example, a so-called transmission mechanism in which a plurality of gears or shafts are combined to change the rotational speed of the engine 10 or the motor 12 in accordance with a gear ratio and allow the rotational speed to be transferred to the axle. The speed reducer 14 may also include, for example, a clutch mechanism that directly connects or separates the rotational power of the engine 10 or the motor 12 to or from the axle.

The PDU 20 is, for example, an inverter, a direct current (DC)-DC converter, or an AC-DC converter. The PDU 20 converts the DC power supplied from the battery 30 into three-phase AC power for driving the motor 12 and outputs the AC power to the motor 12. The PDU 20 may include, for example, a voltage control unit (VCU) that boosts the DC power supplied from the battery 30. The PDU 20 converts the three-phase AC power generated by the motor 12 operating as a regenerative brake into DC power and outputs the DC power to the battery 30. The voltage of the PDU 20 may be boosted or lowered in accordance with the power output destination and the boosted or lowered voltage may be output. Although the components of the PDU 20 are shown as a single unitary configuration in FIG. 1, this is only an example and the components provided in the PDU 20 may be decentralized and arranged in the vehicle 1.

The battery 30 is a battery for traveling of the vehicle 1. The battery 30 is, for example, a battery including a secondary battery capable of iteratively being charged and discharged as a power storage unit such as a lithium-ion battery. The battery 30 may have a configuration that can be easily attached to and detached from the vehicle 1, such as a cassette type battery pack, or may have a stationary configuration that is not easily attached to and detached from the vehicle 1. The secondary battery provided in the battery 30 is, for example, a lithium-ion battery. Although, for example, a capacitor such as an electric double layer capacitor, a composite battery in which a secondary battery and a capacitor are combined, and the like as well as a lead storage battery, a nickel-hydrogen battery, a sodium ion battery, and the like can be considered for the secondary battery provided in the battery 30, the secondary battery may have any configuration. The battery 30 stores (is charged with) electric power introduced from an external charger (not shown) of the vehicle 1 and is discharged to supply the stored power such that the vehicle 1 is allowed to travel. The battery 30 stores (is charged with) the electric power generated by the motor 12 operated as a regenerative brake supplied via the PDU 20 and is discharged to supply the stored electric power for traveling (for example, accelerating) of the vehicle 1. The battery 30 has at least an inductance component.

The battery 30 is an example of a "power storage." An inductance component provided in the battery 30 (an inductance component connected to the power storage unit provided in the battery 30) is an example of an "inductance component."

A battery sensor 32 is connected to the battery 30. The battery sensor 32 detects physical quantities such as a voltage, a current, and a temperature of the battery 30. The battery sensor 32 includes, for example, a voltage sensor, a current sensor, and a temperature sensor. The battery sensor 32 detects the voltage of the battery 30 using the voltage sensor, detects the current of the battery 30 using the current sensor, and detects the temperature of the battery 30 using the temperature sensor. The battery sensor 32 outputs information such as a detected voltage value, current value, and temperature of the battery 30 (hereinafter referred to as "battery information") to the control device 100.

The temperature raising device 40 raises the temperature of the battery 30 in accordance with control from the control device 100. The temperature raising device 40 includes, for example, an AC generation circuit 42 and a controller 44.

The AC generation circuit 42 includes, for example, a capacitor connected to the positive electrode side of the battery 30, a capacitor connected to the negative electrode side of the battery 30, a series switch unit for connecting the capacitors in series with the battery 30, a parallel switch unit for connecting the capacitors in parallel to the battery 30, and an inductor connected between both terminals of the series switch unit. The AC generation circuit 42 generates an AC current (ripple current) by a resonant operation between the inductance component provided in the battery 30 and a capacitor connected to at least the positive electrode side. More specifically, the AC generation circuit 42 generates an AC current based on electric power stored in the battery 30 according to a resonant operation for alternately switching the energy between magnetic energy stored in the inductance component of the battery 30 and electrostatic energy stored in the capacitor connected to at least the positive electrode side. The AC generation circuit 42 causes the temperature of the battery 30 to rise by applying the generated AC current to the battery 30 (or allowing the generated AC current to flow through the battery 30).

The controller 44 switches the connection of each capacitor to the battery 30 to one of the series connection or the parallel connection by causing each of the series switch unit and the parallel switch unit provided in the AC generation circuit 42 to be in a conductive state or a non-conductive state. More specifically, the controller 44 alternately switches the state between a state in which the capacitors are connected in series with the battery 30 by causing the series switch unit to be in the conductive state and causing the parallel switch unit to be in the non-conductive state and a state in which the capacitors are connected in parallel to the battery 30 by causing the series switch unit to be in the non-conductive state and causing the parallel switch unit to be in the conductive state. At this time, the controller 44 may switch the connection of each capacitor to the battery 30 from the series connection to the parallel connection or vice versa so that periods in which both the series switch unit and the parallel switch unit are in a conductive state do not overlap. In other words, the controller 44 provides a so-called dead time during which both the series switch unit and the parallel switch unit are in a non-conductive state and the connection of each capacitor to the battery 30 may be switched from the series connection to the parallel connection or vice versa.

The state in which each capacitor is connected in series with the battery 30 is an example of a "first state," and the state in which each capacitor is connected in parallel to the battery 30 is an example of a "second state." Details of the temperature raising device 40 and the components provided in the temperature raising device 40 will be described below.

The driving operation elements 70 include, for example, an accelerator pedal, a brake pedal, a shift lever, a steering wheel, a variant steering wheel, a joystick, and other operation elements. The driving operation element 70 is equipped with a sensor that detects the presence or absence of an operation of a user (a driver) of the vehicle 1 on each operation element or an amount of operation. The driving operation element 70 outputs a detection result of the sensor to the control device 100.

The vehicle sensor 80 detects a traveling state of the vehicle 1. The vehicle sensor 80 includes, for example, a vehicle speed sensor that detects the speed of the vehicle 1 and an acceleration sensor that detects the acceleration of the vehicle 1. The vehicle sensor 80 outputs a detection result detected by each sensor to the control device 100.

The control device 100 controls an operation of the engine 10 or the motor 12 in accordance with a detection result output by each sensor provided in the driving operation element 70, i.e., an operation of the user (the driver) of the vehicle 1 on each operation element. In other words, the control device 100 controls a driving force of the motor 12. The control device 100 may include, for example, separate control devices such as an engine control unit, a motor control unit, a battery control unit, a PDU control unit, and a VCU control unit. For example, the control device 100 may be replaced with a control device such as an engine electronic control unit (ECU), a motor ECU, a battery ECU, a PDU-ECU, or a VCU-ECU.

The control device 100 controls a supply amount of AC power supplied from the battery 30 to the motor 12 and a frequency (i.e., a voltage waveform) of the AC power to be supplied when the vehicle 1 travels. At this time, the control device 100 controls the activation of the temperature raising device 40 on the basis of information of a temperature of the battery 30 included in the battery information output by the battery sensor 32. That is, the control device 100 controls the activation or stopping of the temperature raising device 40 such that the temperature of the battery 30 is increased (raised) to a temperature suitable for use to limit the deterioration of the charging/discharging performance of the battery 30.

The control device 100 operates, for example, when a hardware processor such as a central processing unit (CPU) executes a program (software). The control device 100 may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The control device 100 may be implemented by a dedicated LSI circuit. The program may be pre-stored in a storage device (a storage device including a non-transitory storage medium) such as a hard disk drive (HDD) or a flash memory provided in the vehicle 1 or may be stored in a removable storage medium (a non-transitory storage medium) such as a DVD or a CD-ROM and installed in the HDD or the flash memory provided in the vehicle 1 when the storage medium is mounted in the drive device provided in the vehicle 1.

[Configuration of AC Generation Circuit Provided in Temperature Raising Device]

Figure 2:
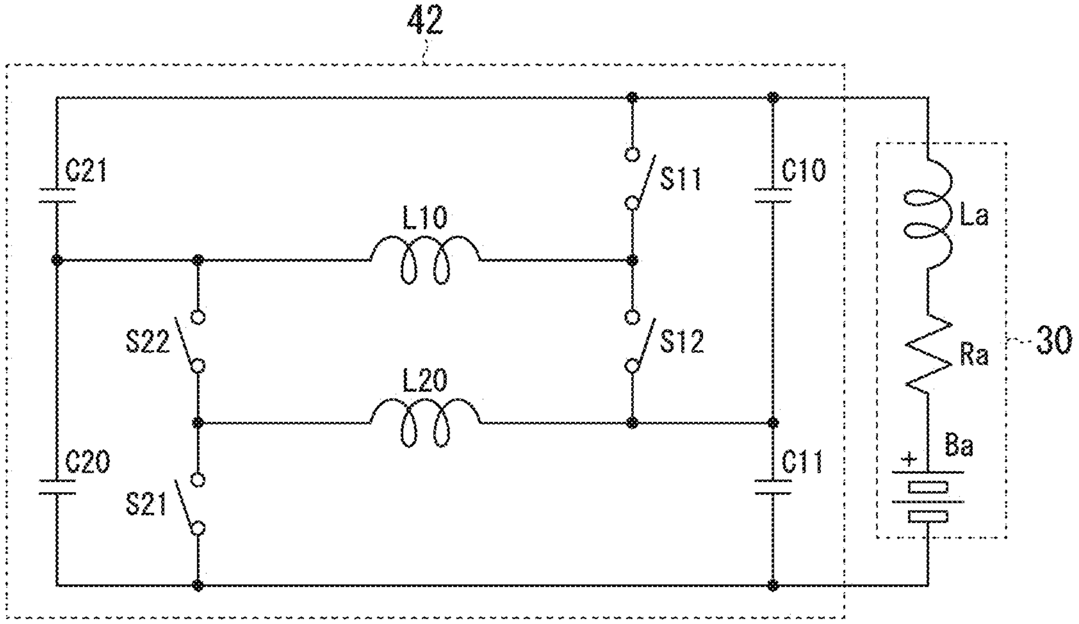
FIG. 2 is a diagram showing an example of a configuration of an AC generation circuit provided in the temperature raising device according to the embodiment.

FIG. 2 is a diagram showing an example of a configuration of the AC generation circuit 42 provided in the temperature raising device 40 according to the embodiment. In FIG. 2, the battery 30 associated with the AC generation circuit 42 is also shown. In the battery 30, for example, resistance Ra and inductance La are connected in series with a positive electrode side of the power storage Ba. The inductance La connected to the power storage Ba provided in the battery 30 is an example of an "inductance component."

The AC generation circuit 42 includes, for example, a capacitor C10, a capacitor C11, a capacitor C20, a capacitor C21, a switch S11, a switch S12, a switch S21, a switch S22, an inductor L10, and an inductor L20.

A first end of the capacitor C10 is connected to a positive electrode side of the battery 30. Furthermore, the first end of the capacitor C10 is connected to a first terminal of the switch S11 and a first end of the capacitor C21. A second end of the capacitor C10 is connected to a first end of the capacitor C11. Furthermore, a second end of the capacitor C10 is connected to a second terminal of the switch S12 and a first end of the inductor L20. A second end of the capacitor C11 is connected to a negative electrode side of the battery 30. Furthermore, the second end of the capacitor C11 is connected to a second terminal of the switch S21 and a second end of the capacitor C20. A first end of the capacitor C20 is connected to the second end of the capacitor C21. Furthermore, the first end of the capacitor C20 is connected to a first terminal of the switch S22 and a second end of the inductor L10. A second terminal of the switch S11 is connected to a first terminal of the switch S12 and a first end of the inductor L10. A first terminal of the switch S21 is connected to a second terminal of the switch S22 and a second end of the inductor L20.

Each of the capacitor C10 and the capacitor C20 is a capacitor whose connection is switched between a connection in series with the battery 30 and a connection in parallel to the battery 30. Each of the capacitor C10 and the capacitor C20 is a capacitor whose connection is switched between a connection in series with the battery 30 and a connection in parallel to the battery 30, so that an AC current (ripple current) is generated according to a resonant operation associated with the inductance component provided in the battery 30. The capacitor C10 and the capacitor C20 are capacitors having the same capacitance as each other. Each of the capacitor C11, the capacitor C21, the inductor L10, and the inductor L20 is a component for making an adjustment so that the total impedance of the AC generation circuit 42 is similar in a state in which each of the capacitor C10 and the capacitor C20 is connected in series with the battery 30 and a state in which each of the capacitor C10 and the capacitor C20 is connected in parallel to the battery 30. The capacitor C11 and the capacitor C21 are capacitors having the same capacitance as each other. The inductor L10 and the inductor L20 are inductors having the same inductance as each other.

Each of the switch S11, the switch S12, the switch S21, and the switch S22 is controlled to be in a conductive state in which a connection is established between both terminals thereof (a closed state) or a non-conductive state in which a connection is not established between both terminals thereof (an open state) in accordance with a control signal output by the controller 44. The controller 44 controls the switch S12 and the switch S22 as a series switch unit in which the capacitor C10 and the capacitor C20 are connected in series with the battery 30. The controller 44 controls the switch S11 and the switch S21 as a parallel switch unit in which the capacitor C10 and the capacitor C20 are connected in parallel to the battery 30.

Each of the switch S11, the switch S12, the switch S21, and the switch S22 may be, for example, a semiconductor switching element that is controlled to be in an ON or OFF state such as an N-channel metal oxide semiconductor field effect transistor (MOSFET). In this case, for example, a configuration in which diodes functioning as flyback diodes are further connected in parallel may be adopted. When each of the switch S11, the switch S12, the switch S21, and the switch S22 is composed of a semiconductor switching element, the controller 44 outputs a gate signal for causing the semiconductor switching element to be in the ON state or the OFF state as a control signal for controlling each of the switch S11, the switch S12, the switch S21, and the switch S22 to be in the conductive state or the non-conductive state.

In the following description, the control signal for controlling the switch S11 to be in the conductive state or the non-conductive state output by the controller 44 is referred to as a "control signal CS11," a control signal for controlling the switch S12 to be in the conductive state or the non-conductive state is referred to as a "control signal CS12," a control signal for controlling the switch S21 to be in the conductive state or the non-conductive state is referred to as a "control signal CS21," and a control signal for controlling the switch S22 to be in the conductive state or the non-conductive state is referred to as a "control signal CS22." When the switch S12 and the switch S22 are simultaneously controlled as a series switch unit and the switch S11 and the switch S21 are simultaneously controlled as a parallel switch unit, the controller 44 may output the control signal CS12 and the control signal CS22 as the same control signal CS and may output the control signal CS11 and the control signal CS21 as the same control signal CS.

According to this configuration, in the AC generation circuit 42, the capacitor C10 and the capacitor C20 are connected in series or in parallel between the positive and negative electrode sides of the battery 30 in accordance with control from the controller 44. More specifically, the controller 44 causes the capacitor C10 and the capacitor C20 to be connected in series between the positive electrode side and the negative electrode side of the battery 30 by outputting the control signal CS11 for causing the switch S11 to be in the non-conductive state to the switch S11, outputting the control signal CS21 for causing the switch S21 to be in the non-conductive state to the switch S21, outputting the control signal CS12 for causing the switch S12 to be in the conductive state to the switch S12, and outputting the control signal CS22 for causing the switch S22 to be in the conductive state to the switch S22. On the other hand, the controller 44 causes the capacitor C10 and the capacitor C20 to be connected in parallel between the positive electrode side and the negative electrode side of the battery 30 by outputting the control signal CS11 for causing the switch S11 to be in the conductive state to the switch S11, outputting the control signal CS21 for causing the switch S21 to be in the conductive state to the switch S21, outputting the control signal CS12 for causing the switch S12 to be in the non-conductive state to the switch S12, and outputting the control signal CS22 for causing the switch S22 to be in the non-conductive state to the switch S22.

In the AC generation circuit 42, the capacitor C10 is an example of a "first capacitor," the capacitor C11 is an example of a "second capacitor," the capacitor C20 is an example of a "third capacitor," and the capacitor C21 is an example of a "fourth capacitor." In the AC generation circuit 42, the switch S11 is an example of a "first switch," the switch S12 is an example of a "second switch," the switch S21 is an example of a "third switch," and the switch S22 is an example of a "fourth switch." In the AC generation circuit 42, the inductor L10 is an example of a "first inductor," and the inductor L20 is an example of a "second inductor." The control signal CS11 output to the switch S11 by the controller 44 and the control signal CS21 output to the switch S21 thereby are examples of a "first control signal," and the control signal CS12 output to the switch S12 by the controller 44 and the control signal CS22 output to the switch S22 thereby are examples of a "second control signal." A state in which the controller 44 causes the switch S11 and the switch S21 to be in the non-conductive state according to the control signal CS11 and the control signal CS21 and causes the switch S12 and the switch S22 to be in the conductive state according to the control signal CS12 and the control signal CS22 is an example of a "first state." A state in which the controller 44 causes the switch S11 and the switch S21 to be in the conductive state according to the control signal CS11 and the control signal CS21 and causes the switch S12 and the switch S22 to be in the non-conductive state according to the control signal CS12 and the control signal CS22 is an example of a "second state."

[Operation of AC Generation Circuit]

Here, the frequency of the AC current generated by the AC generation circuit 42 is considered. It is preferable that the electric current waveform of the AC current generated by the AC generation circuit 42 be a waveform of a sinusoidal wave so that the temperature raising device 40 efficiently raises the temperature of the battery 30.

Meanwhile, as described above, in the AC generation circuit 42, the capacitor C10 and the capacitor C20 are capacitors having the same capacitance as each other. Thus, when the capacitor C10 and the capacitor C20 are connected in series with and in parallel to the battery 30 in the AC generation circuit 42, the total capacitance is different between the series connection and the parallel connection if the capacitor C10 and the capacitor C20 are considered to be one capacitor. More specifically, when the capacitor C10 and the capacitor C20 are connected in series, the total capacitance of the AC generation circuit 42 is a reciprocal of a sum of reciprocals of individual capacitances of the capacitors, i.e., half the capacitance. On the other hand, when the capacitor C10 and the capacitor C20 are connected in parallel, the total capacitance of the AC generation circuit 42 is a sum of individual capacitances of the capacitors, i.e., twice the capacitance. In other words, when the capacitor C10 and the capacitor C20 are connected in series with and in parallel to the battery 30, a difference between the total capacitances of the AC generation circuit 42 is increased by a factor of four. Thus, when the capacitor C10 and the capacitor C20 are connected in series with and in parallel to the battery 30 in the AC generation circuit 42, a difference between the frequencies of the generated AC current is increased by a factor of two.

Figure 3:
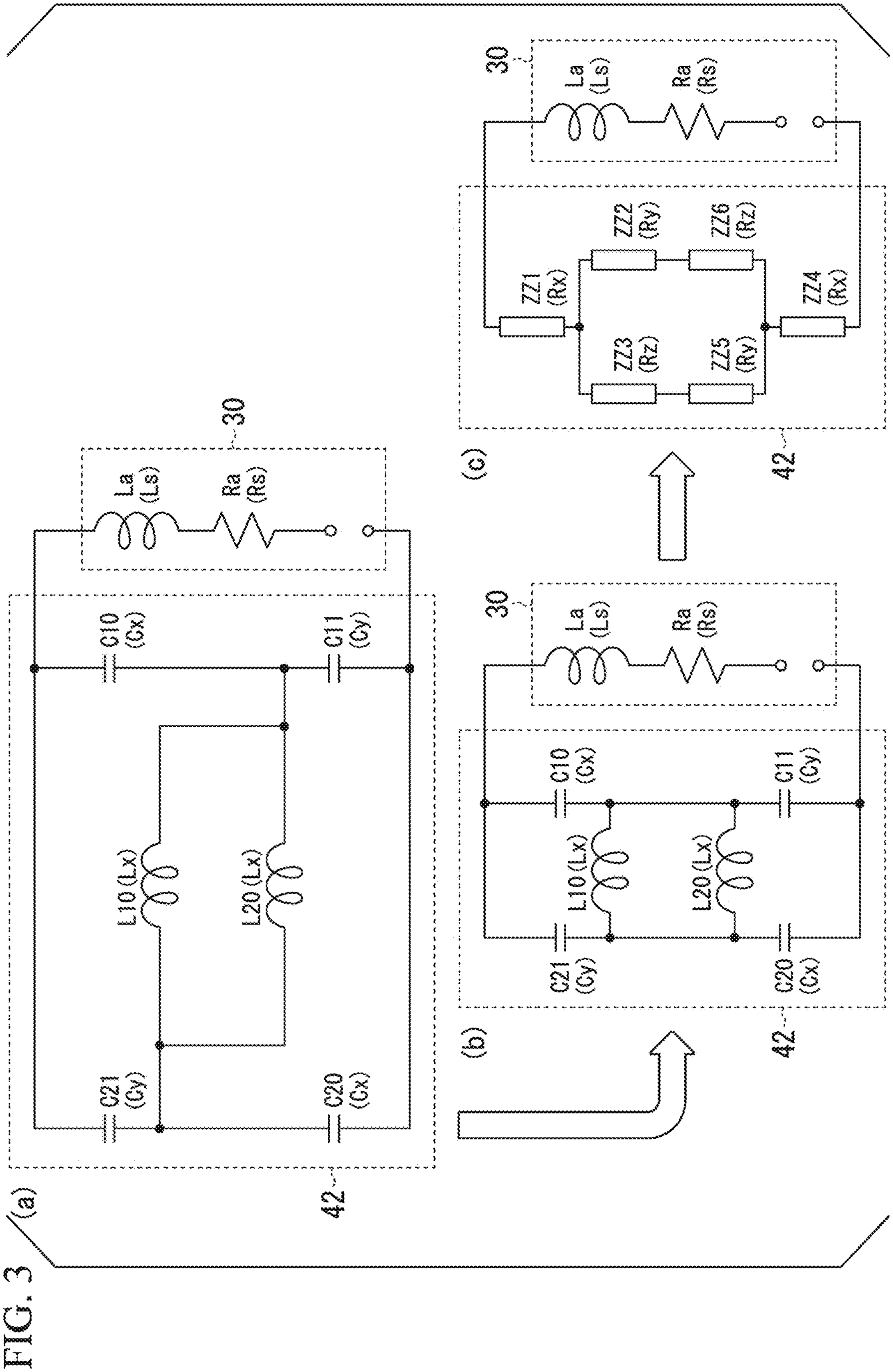
FIG. 3 is an example of an equivalent circuit of a series connection in the AC generation circuit of the embodiment.
Figure 4:
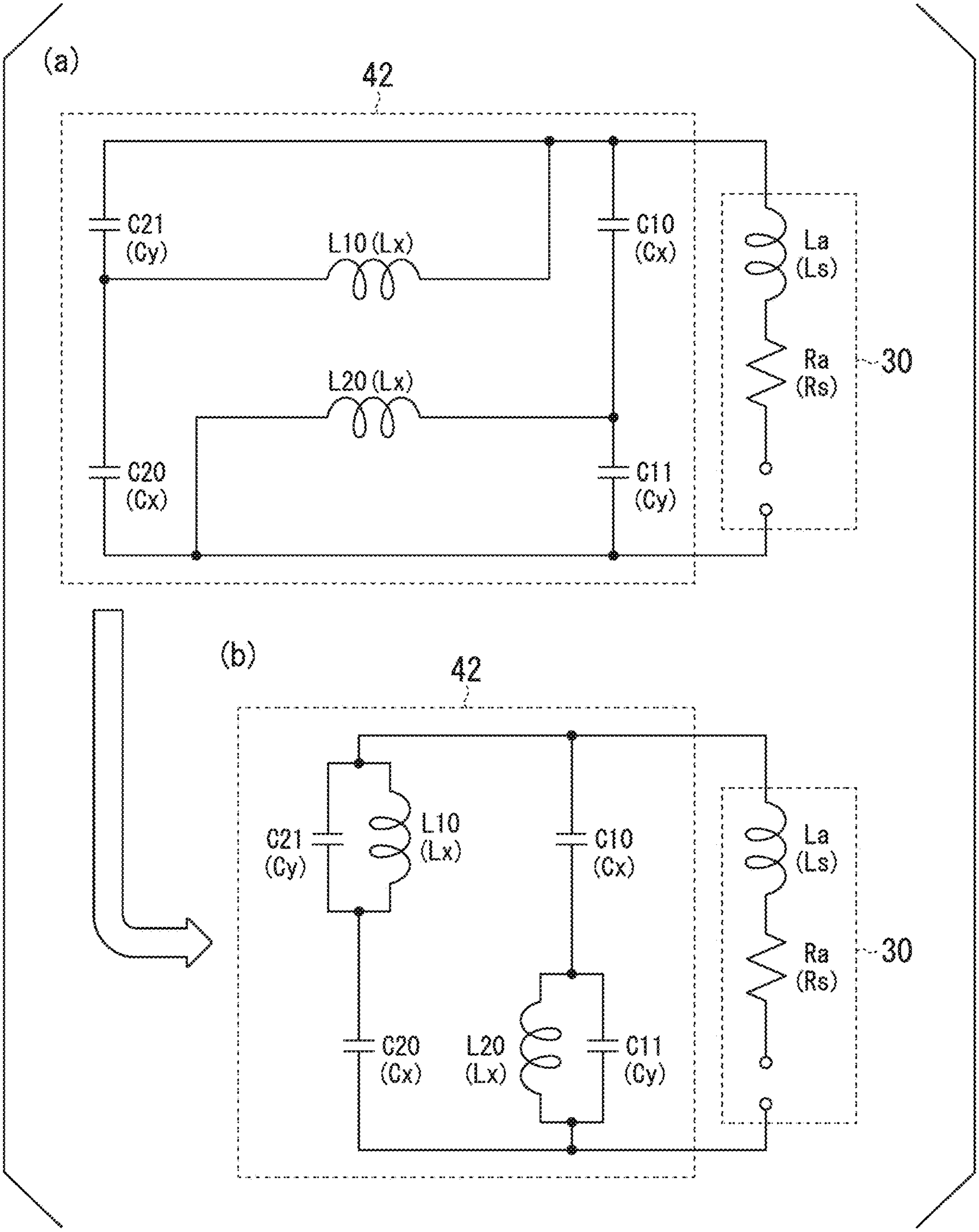
FIG. 4 is an example of an equivalent circuit of a parallel connection in the AC generation circuit of the embodiment.

Here, a difference between the cases where the capacitor C10 and the capacitor C20 are connected in series with and in parallel to the battery 30 in the AC generation circuit 42 will be described. FIG. 3 is an example of an equivalent circuit of the series connection in the AC generation circuit 42 of the embodiment. FIG. 4 is an example of an equivalent circuit of the parallel connection in the AC generation circuit 42 of the embodiment. The equivalent circuit of the case where the capacitor C10 and the capacitor C20 are connected in series with the battery 30 is shown in FIG. 3 and the equivalent circuit of the case where the capacitor C10 and the capacitor C20 are connected in parallel to the battery 30 is shown in FIG. 4. Equivalent circuits of the case where the switch S11, the switch S12, the switch S21, and the switch S22 are simply in the conductive state or the non-conductive state in the AC generation circuit 42 shown in FIG. 2 are shown in (a) of FIG. 3 and (a) of FIG. 4 and equivalent circuits obtained by making the equivalent circuit shown in (a) of FIG. 3 or (a) of FIG. 4 easier to see are shown in (b) of FIG. 3 and (b) of FIG. 4. Furthermore, an equivalent circuit obtained by performing Y-A conversion of the equivalent circuit shown in (b) of FIG. 3 is shown in (c) of FIG. 3. In FIGS. 3 and 4, an inductance component of the inductance La provided in the battery 30 is denoted by "Ls" and a resistance component of the resistance Ra is denoted by "Rs." In (a) of FIG. 3, (b) of FIG. 3, (a) of FIG. 4, and (b) of FIG. 4, the capacitances of the capacitor C10 and the capacitor C20 are denoted by "Cx," the capacitances of the capacitor C11 and the capacitor C21 are denoted by "Cy," and inductances of the inductor L10 and the inductor L20 are denoted by "Lx." Furthermore, in (c) of FIG. 3, impedance components of impedance ZZ1 and impedance ZZ4 are denoted by "Rx," impedance components of impedance ZZ2 and impedance ZZ5 are denoted by "Ry," and impedance components of impedance ZZ3 and impedance ZZ6 are denoted by "Rz."

The capacitance Cx of each of the capacitor C10 and the capacitor C20 is an example of "first capacitance" and the capacitance Cy of each of the capacitor C11 and the capacitor C21 is an example of "second capacitance."

As shown in (a) of FIG. 3 and (b) of FIG. 3, when the capacitor C10 and the capacitor C20 are connected in series with the battery 30 in the AC generation circuit 42, the capacitor C10 and the capacitor C20 are connected in series via the inductor L10 and the inductor L20, the capacitor C11 is inserted in series between the capacitor C10 and the negative electrode side of the battery 30, and the capacitor C21 is inserted in series between the capacitor C20 and the positive electrode side of the battery 30. On the other hand, as shown in (a) of FIG. 4 and (b) of FIG. 4, when the capacitor C10 and the capacitor C20 are connected in parallel to the battery 30 in the AC generation circuit 42, a parallel circuit of the capacitor C11 and the inductor L20 is inserted in series between the capacitor C10 and the negative electrode side of the battery 30 and a parallel circuit of the capacitor C21 and the inductor L10 is inserted in series between the capacitor C20 and the positive electrode side of the battery 30. Thus, the AC generation circuit 42 can align the frequency of the AC current to be generated during each of the series connection and the parallel connection of the capacitor C10 and the capacitor C20 according to a difference between connections of the capacitor C11, the capacitor C21, the inductor L10, and the inductor L20 in the case of the series connection and the parallel connection of the capacitor C10 and the capacitor C20. Furthermore, in the AC generation circuit 42, the electric current waveform of the AC current to be generated can be made closer to a waveform of a sinusoidal wave during each of the series connection and the parallel connection of the capacitor C10 and the capacitor C20.

Comparative Example

Configuration of AC Generation Circuit of Comparative Example

Figure 5:
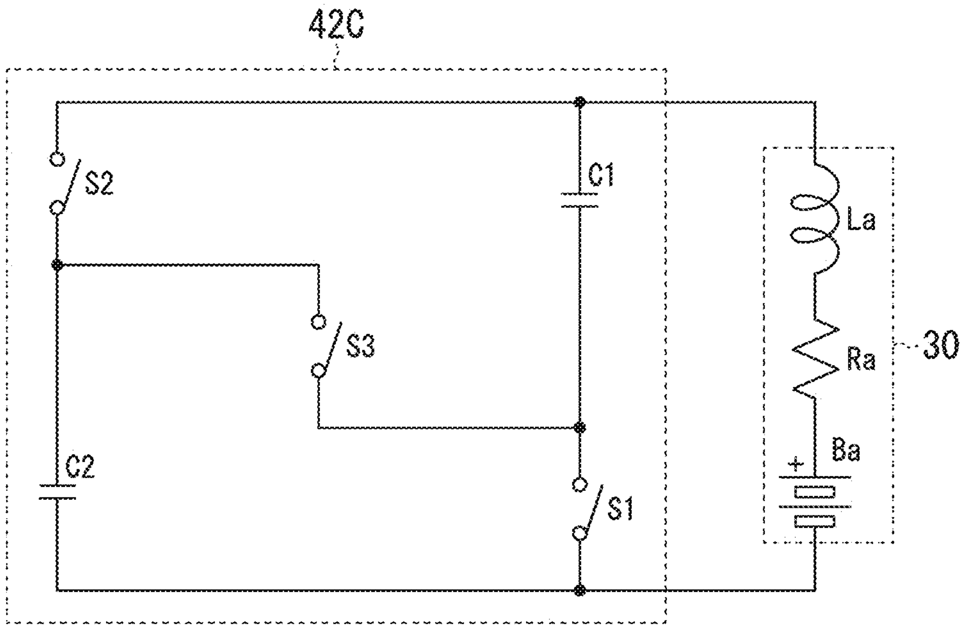
FIG. 5 is a diagram showing an example of a configuration of an AC generation circuit of a comparative example.

Here, an AC generation circuit of a comparative example in which the capacitor C11, the capacitor C21, the inductor L10, and the inductor L20 are not provided (hereinafter referred to as an "AC generation circuit 42C") will be first described to describe the effect in the configuration of the AC generation circuit 42. FIG. 5 is a diagram showing an example of a configuration of the AC generation circuit 42C of the comparative example.

The AC generation circuit 42C includes, for example, a capacitor C1, a capacitor C2, a switch S1, a switch S2, and a switch S3. The capacitor C1 and the capacitor C2 are capacitors having the same capacitance. Each of the switch S1, the switch S2, and the switch S3 is controlled to be in the conductive state or the non-conductive state between both terminals thereof, for example, in accordance with a control signal CS output by the controller 44. In the following description, a control signal for controlling the switch S1 to be in the conductive state or the non-conductive state output by the controller 44 is referred to as a "control signal CS1," and a control signal for controlling the switch S2 to be in the conductive state or the non-conductive state is referred to as a "control signal C52," and a control signal for controlling the switch S3 to be in the conductive state or the non-conductive state is referred to as a "control signal C53."

A first end of the capacitor C1 is connected to a positive electrode side of a battery 30. Furthermore, the first end of the capacitor C1 is connected to a first terminal of the switch S2. A second end of the capacitor C1 is connected to a first terminal of the switch S1 and a second terminal of the switch S3. A second end of the capacitor C2 is connected to a negative electrode side of the battery 30. Furthermore, the second end of the capacitor C2 is connected to a second terminal of the switch S1. A first end of the capacitor C2 is connected to a second terminal of the switch S2 and a first terminal of the switch S3.

In the AC generation circuit 42C, the capacitor C1 corresponds to the capacitor C10 provided in the AC generation circuit 42 and the capacitor C2 corresponds to the capacitor C20 provided in the AC generation circuit 42. In the AC generation circuit 42C, the switch S1 corresponds to the switch S21 provided in the AC generation circuit 42 and the switch S2 corresponds to the switch S11 provided in the AC generation circuit 42. In the AC generation circuit 42C, the switch S3 corresponds to the switch S12 and the switch S22 provided in the AC generation circuit 42. Accordingly, the AC generation circuit 42C has a configuration in which the capacitor C11, the capacitor C21, the inductor L10, and the inductor L20 are omitted from the AC generation circuit 42.

Figure 6:
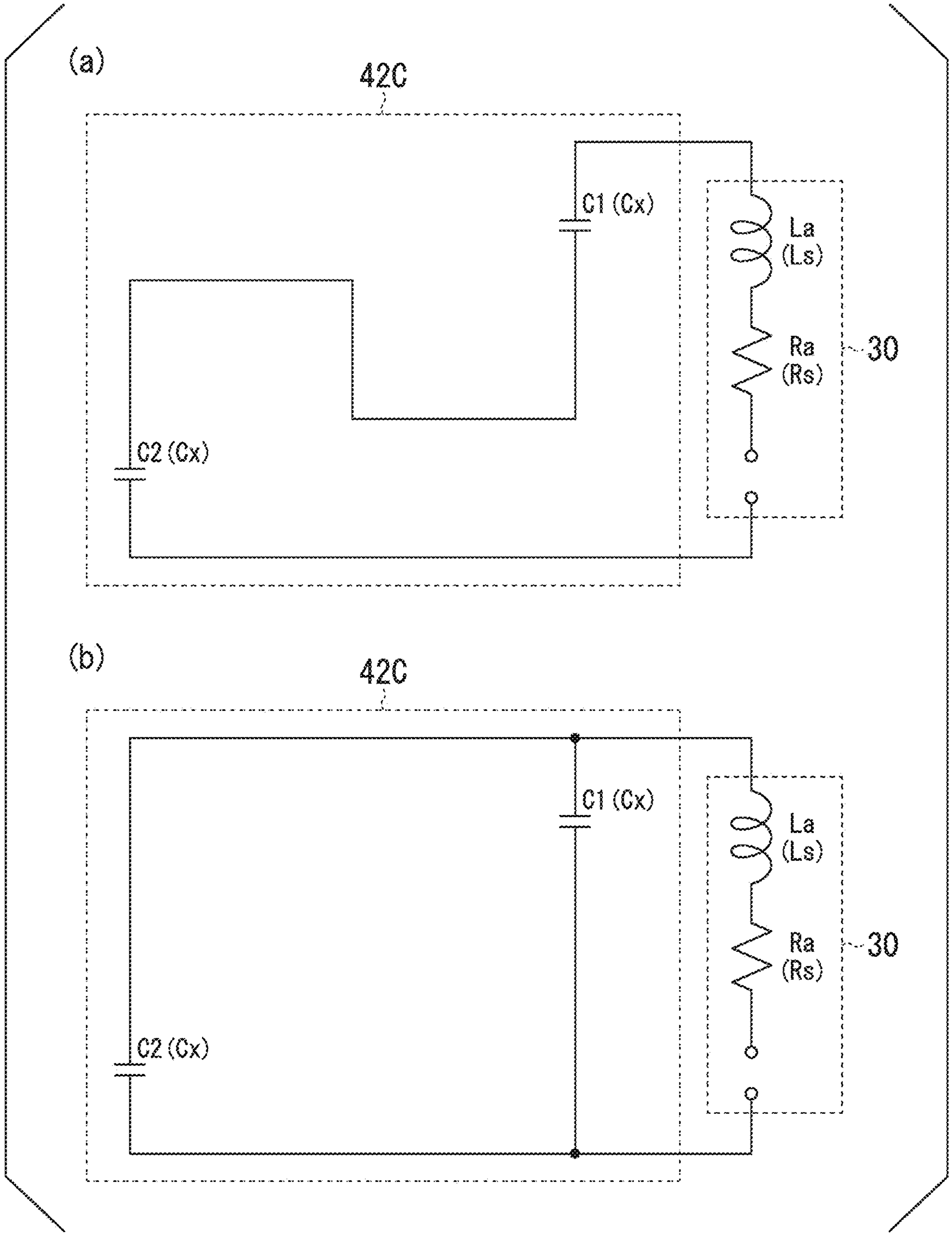
FIG. 6 is an example of an equivalent circuit of the AC generation circuit of a comparative example.

FIG. 6 is an example of an equivalent circuit of the AC generation circuit 42C of the comparative example. In (a) of FIG. 6, an equivalent circuit of a case where the capacitor C1 and the capacitor C2 are connected in series with the battery 30 in the AC generation circuit 42C is shown. In (b) of FIG. 6, an equivalent circuit of a case where the capacitor C1 and the capacitor C2 are connected in parallel to the battery 30 in the AC generation circuit 42C is shown. In FIG. 6, as in the equivalent circuit of the AC generation circuit 42 shown in FIGS. 3 and 4, an inductance component of the inductance La of the battery 30 is denoted by "Ls" and a resistance component of the resistance Ra is denoted by "Rs." The capacitances of the capacitor C1 and the capacitor C2 are denoted by "Cx."

Here, a frequency of an AC current generated by the AC generation circuit 42C will be described with reference to FIG. 6. In the AC generation circuit 42C, impedance Z of a case where the capacitor C1 and the capacitor C2 are connected in series as shown in (a) of FIG. 6 can be obtained as shown in the following Eq. (1).

$$\begin{aligned} Z &= ZLs + 2ZCx + Rs \\ &= j\omega Ls + \frac{2}{j\omega Cx} + Rs \\ &= j\left(\omega Ls - \frac{2}{\omega Cx}\right) + Rs \end{aligned} \tag{1}$$

A resonant frequency ° is of a case where the capacitor C1 and the capacitor C2 are connected in series in the AC generation circuit 42C can be obtained as shown in the following Eq. (2).

$$\omega s = \sqrt{2} \cdot \frac{1}{\sqrt{Cx \cdot Ls}} \tag{2}$$

On the other hand, in the AC generation circuit 42C, the impedance Z of a case where the capacitor C1 and the capacitor C2 are connected in parallel as shown in (b) of FIG. 6 can be obtained as shown in the following Eq. (3).

$$Z = ZLs + \frac{ZCx}{2} + Rs = j\omega Ls + \frac{1}{2j\omega Cx} + Rs = \frac{1 - 2\omega^2 LsCx}{2j\omega Cx} + Rs \tag{3}$$

A resonant frequency ωp of a case where the capacitor C1 and the capacitor C2 are connected in parallel in the AC generation circuit 42C can be obtained as shown in the following Eq. (4).

$$\omega p = \frac{1}{\sqrt{2}} \cdot \frac{1}{\sqrt{Cx \cdot Ls}} \tag{4}$$

In the AC generation circuit 42C, when the resonant frequency ωs of the case where the capacitor C1 and the capacitor C2 are connected in series and the resonant frequency ωp of the case where the capacitor C1 and the capacitor C2 are connected in parallel are compared, a ratio represented by the following Eq. (5) is given.

$$\omega s : \omega p = 2:1 \tag{5}$$

That is, in the AC generation circuit 42C, the resonant frequency ω differs according to a total capacitance difference between the cases where the capacitor C1 and the capacitor C2 are connected in series and in parallel. More specifically, the resonant frequency ωs of the case where the capacitor C1 and the capacitor C2 are connected in series is twice the resonant frequency ωp of the case where the capacitor C1 and the capacitor C2 are connected in parallel. Thus, in the AC generation circuit 42C, the electric current waveform of the AC current to be generated does not become a waveform of a sinusoidal wave and the electric current waveform becomes asymmetric when the AC current has a positive current value and when the AC current has a negative current value. Thus, in the AC generation circuit 42C, a large harmonic component is included in the generated AC current and a large amount of noise is emitted when the temperature of the battery 30 is raised.

Thus, the AC generation circuit 42C reduces the efficiency when the temperature of the battery 30 is raised, for example, in a case where a configuration in which a plurality of batteries 30 are combined is adopted for the battery 30 mounted in the vehicle 1. For example, if a configuration in which two batteries 30 are combined as the batteries 30 is adopted, it is conceivable to reduce the total voltage fluctuation (so-called voltage waveform ripple) when the temperature of the battery 30 is raised by connecting AC generation circuits 42C to the batteries 30 and providing a prescribed phase difference between electric current waveforms of the AC currents generated by the AC generation circuits 42C. That is, it is conceivable to reduce the total voltage fluctuation when the temperature of the battery 30 is raised by shifting the phase of the electric current waveform of the AC current generated by each AC generation circuit 42C by a prescribed phase between the AC generation circuits 42C. However, in the AC generation circuit 42C, it is difficult to sufficiently reduce the total voltage fluctuation because the electric current waveform of the AC current is asymmetric on the positive and negative sides. Thus, it is difficult to efficiently raise the temperature of the battery 30 in the temperature raising device adopting the AC generation circuit 42C (hereinafter referred to as a "temperature raising device 40C").

The frequency of the AC current generated by the AC generation circuit 42 will be described with reference back to FIGS. 3 and 4. First, the resonant frequency ωs of the case where the capacitor C10 and the capacitor C20 are connected in series shown in FIG. 3 is conceivable.

Impedance Zs of the case where the capacitor C10 and the capacitor C20 are connected in series in the AC generation circuit 42 can be obtained from the equivalent circuit shown in (c) of FIG. 3 as shown in the following Eq. (6).

$$Zs = ZLs + 2Rx + \frac{Ry + Rz}{2} + Rs \tag{6}$$

On the basis of the above Eq. (6), when applied to the equivalent circuit shown in (b) of FIG. 3, the impedance Zs of the case where the capacitor C10 and the capacitor C20 are connected in series in the AC generation circuit 42 can be expressed as in the following Eq. (7).

$$\begin{aligned} Zs &= ZLs + 2\frac{ZCxZCy}{ZCx + ZCy + ZLx} + \frac{1}{2}\left(\frac{ZCyZLx}{ZCx + ZCy + ZLx} + \frac{ZCxZLx}{ZCx + ZCy + ZLx}\right) + Rs \\ &= ZLs + \frac{1}{2}\frac{4ZCxZCy + ZCyZLx + ZCxZLx}{ZCx + ZCy + ZLx} + Rs \\ &= \frac{1}{2}\frac{2ZLsZCx + 2ZLsZCy + 2ZLsZLx + 4ZCxZCy + ZCyZLx + ZCxZLx}{ZCx + ZCy + ZLx} + Rs \\ &= \frac{1}{2}\frac{2ZLsZLx + 2ZLsZCy + ZCyZLx + ZCxZLx + 2ZLsZCx + 4ZCxZCy}{ZCx + ZCy + ZLx} + Rs \\ &= \frac{1}{2}\frac{2j\omega Ls \cdot j\omega Lx + \frac{2j\omega Ls}{j\omega Cy} + \frac{j\omega Lx}{j\omega Cy} + \frac{j\omega Lx}{j\omega Cx} + \frac{2j\omega Ls}{j\omega Cx} + 4\frac{1}{j\omega Cx}\frac{1}{j\omega Cy}}{\frac{1}{j\omega Cx} + \frac{1}{j\omega Cy} + j\omega Lx} + Rs \\ &= \frac{1}{2}\frac{-2\omega^2 LsLx + \frac{2Ls}{Cy} + \frac{Lx}{Cy} + \frac{Lx}{Cx} + \frac{2Ls}{Cx} - \frac{4}{\omega^2 CxCy}}{j\omega\left(Lx - \frac{1}{\omega^2 Cx} - \frac{1}{\omega^2 Cy}\right)} + Rs \\ &= -\frac{1}{2j\omega Lx}\frac{2LsLx\cdot\omega^4 - \left(\frac{2Ls}{Cy} + \frac{Lx}{Cy} + \frac{Lx}{Cx} + \frac{2Ls}{Cx}\right)\omega^2 + \frac{4}{CxCy}}{\omega^2 - \frac{1}{LxCx} - \frac{1}{LxCy}} + Rs \end{aligned} \tag{7}$$

That is, the impedance Zs can be obtained as shown in the following Eq. (8).

$$Zs = -\frac{1}{2j\omega LX}\frac{2LsLx\cdot\omega^4 - \left(\frac{2Ls}{Cy} + \frac{Lx}{Cy} + \frac{Lx}{Cx} + \frac{2Ls}{Cx}\right)\omega^2 + \frac{4}{CxCy}}{\omega^2 - \frac{1}{LxCx} - \frac{1}{LxCy}} + Rs \tag{8}$$

Thus, a resonance point of the AC current generated when the capacitor C10 and the capacitor C20 are connected in series in the AC generation circuit 42 is a point where a condition in which the first term on the right side of the above Eq. (8) is zero is satisfied. That is, a point where the impedance Zs and the resistance component Rs of the resistance Ra provided in the battery 30 are equal (the following Eq. (9)) is a resonance point of an AC current to be generated when the capacitor C10 and the capacitor C20 are connected in series in the AC generation circuit 42.

$$Zs=Rs \tag{9}$$

However, a condition in which the denominator of the first term on the right side of the above Eq. (8) is not zero as shown in the following Inequality (10) is given so that the above Eq. (9) is satisfied.

$$\omega^2-\frac{1}{LxCx}-\frac{1}{LxCy}\neq 0 \tag{10}$$

Accordingly, the resonant frequency ω satisfying a quadratic equation represented by the following Eq. (11) in which the numerator of the first term on the right side of the above Eq. (8) is zero is the resonant frequency ωs when the capacitor C10 and the capacitor C20 are connected in series in the AC generation circuit 42.

$$2LsLx\cdot\omega^4-\left(\frac{2Ls}{Cy}+\frac{Lx}{Cy}+\frac{Lx}{Cx}+\frac{2Ls}{Cx}\right)^2+\frac{4}{CxCy}=0 \tag{11}$$

Consequently, the resonant frequency ωs of the case where the capacitor C10 and the capacitor C20 are connected in series in the AC generation circuit 42 can be represented by the following Eq. (12).

$$\omega s^2=\frac{\left(\frac{2Ls}{Cy}+\frac{Lx}{Cy}+\frac{Lx}{Cx}+\frac{2Ls}{Cx}\right)\pm\sqrt{\left(\frac{2Ls}{Cy}+\frac{Lx}{Cy}+\frac{Lx}{Cx}+\frac{2Ls}{Cx}\right)^2-\frac{32LsLx}{CxCy}}}{4LsLx} \tag{12}$$

At this time, if the condition of the following Eq. (13) is satisfied, there are two types of resonant frequencies cos when the capacitor C10 and the capacitor C20 are connected in series in the AC generation circuit 42.

$$\left(\frac{2Ls}{Cy}+\frac{Lx}{Cy}+\frac{Lx}{Cx}+\frac{2Ls}{Cx}\right)^2-\frac{32LsLx}{CxCy}>0 \tag{13}$$

In this regard, when the capacitor C10 and the capacitor C20 are connected in series in the AC generation circuit 42, one type of resonant frequency ωs is given if the capacitance Cx of each of the capacitor C10 and the capacitor C20 is the same as the capacitance Cy of each of the capacitor C11 and the capacitor C21 (the following Eq. (14)).

$$Cx=Cy \tag{14}$$

More specifically, the impedance Zs of a case where the capacitance Cx and the capacitance Cy are in the above Eq. (14) is obtained as shown in the following Eq. (15).

$$\begin{aligned} Zs &= -\frac{1}{2j\omega Lx}\,\frac{2LsLx\cdot\omega^4-\left(\frac{2Ls}{Cy}+\frac{Lx}{Cy}+\frac{Lx}{Cx}+\frac{2Ls}{Cx}\right)\omega^2+\frac{4}{CxCy}}{\omega^2-\frac{1}{LxCx}-\frac{1}{LxCy}}+Rs \\ &= -\frac{1}{2j\omega Lx}\,\frac{2LsLx\cdot\omega^4-\left(\frac{2Ls}{Cx}+\frac{Lx}{Cx}+\frac{Lx}{Cx}+\frac{2Ls}{Cx}\right)\omega^2+\frac{4}{CxCx}}{\omega^2-\frac{1}{LxCx}-\frac{1}{LxCx}}+Rs \\ &= -\frac{1}{2j\omega Lx}-\frac{2LsLx\cdot\omega^4-\frac{2}{Cx}(2Ls+Lx)\omega^2+\frac{4}{Cx^2}}{\omega^2-\frac{2}{LxCx}}+Rs \\ &= -\frac{1}{2j\omega Lx}\,\frac{\left(\omega^2-\frac{2}{LxCx}\right)\left(2LsLx\cdot\omega^2-\frac{2Lx}{Cx}\right)}{\omega^2-\frac{2}{LxCx}}+Rs \\ &= -\frac{Ls\cdot\omega^2-\frac{1}{Cx}}{j\omega}+Rs \end{aligned} \tag{15}$$

In this case, one type of resonant frequency ωs becomes a resonant frequency ωs at which the resonance point of the AC current is the above Eq. (9) is expressed by the following Eq. (16).

$$\omega s^2=\frac{1}{LsCx} \tag{16}$$

Next, the resonant frequency ωp when the capacitor C10 and the capacitor C20 are connected in parallel shown in FIG. 4 is taken into account.

Impedance Zp of a case where the capacitor C10 and the capacitor C20 are connected in parallel in the AC generation circuit 42 can be obtained from the equivalent circuit shown in (b) of FIG. 4 as shown in the following Eq. (17).

$$\begin{aligned} Zp &= ZLs+\frac{1}{2}\left(\frac{1}{\frac{1}{ZLx}+\frac{1}{ZCy}}+ZCy\right)+Rs \\ &= ZLs+\frac{1}{2}\left(\frac{ZLxZCy}{ZLx+ZCy}+ZCx\right)+Rs \\ &= \frac{1}{2}\,\frac{2ZLsZLx+2ZLsZCy+ZLxZCy+ZCxZLx+ZCxZCy}{ZLx+ZCy}+Rs \\ &= \frac{1}{2}\,\frac{2j\omega Ls\cdot j\omega Lx+\frac{2j\omega Ls}{j\omega Cy}+\frac{j\omega Lx}{j\omega Cy}+\frac{j\omega Lx}{j\omega Cx}+\frac{1}{j\omega Cx}\frac{1}{j\omega Cy}}{j\omega Lx+\frac{1}{j\omega Cy}}+Rs \\ &= \frac{1}{2}\,\frac{-2\omega^2LsLx+\frac{2Ls}{Cy}+\frac{Lx}{Cy}+\frac{Lx}{Cx}-\frac{1}{\omega^2CxCy}}{j\frac{Lx}{\omega}\left(\omega^2-\frac{1}{LxCy}\right)}+Rs \\ &= -\frac{1}{2j\omega Lx}\,\frac{2LsLx\cdot\omega^4-\left(\frac{2Ls}{Cy}+\frac{Lx}{Cy}+\frac{Lx}{Cx}\right)\omega^2+\frac{1}{CxCy}}{\omega^2-\frac{1}{LxCy}}+Rs \end{aligned} \tag{17}$$

That is, the impedance Zp can be obtained as shown in the following Eq. (18).

$$Zp = -\frac{1}{2j\omega Lx}\frac{2LsLx\cdot\omega^4 - \left(\frac{2Ls}{Cy} + \frac{Lx}{Cy} + \frac{Lx}{Cx}\right)\omega^2 + \frac{1}{CxCy}}{\omega^2 - \frac{1}{LxCy}} + Rs \tag{18}$$

Thus, the resonance point of the AC current generated when the capacitor C10 and the capacitor C20 are connected in parallel in the AC generation circuit 42 becomes a point where a condition in which a part of the first term on the right side of the above Eq. (18) is zero is satisfied according to a concept similar to that of the case where the capacitor C10 and the capacitor C20 are connected in series. That is, a point where the impedance Zp is the same as the resistance component Rs of the resistance Ra provided in the battery 30 (the following Eq. (19)) is the resonance point of the AC current to be generated when the capacitor C10 and the capacitor C20 are connected in parallel in the AC generation circuit 42.

$$Zp=Rs \tag{19}$$

In this regard, a condition in which the denominator of the first term on the right side of the above Eq. (18) is not zero is given as shown in the following Inequality (20) as in the case where the capacitor C10 and the capacitor C20 are connected in series so that the above Eq. (19) is satisfied.

$$\omega^2 - \frac{1}{LxCy} \neq 0 \tag{20}$$

Accordingly, the resonant frequency ω satisfying a quadratic equation represented by the following Eq. (21) in which the numerator of the first term on the right side of the above Eq. (18) is zero is the resonant frequency ωp when the capacitor C10 and the capacitor C20 are connected in parallel in the AC generation circuit 42.

$$2LsLx\cdot\omega^4 - \left(\frac{2Ls}{Cy} + \frac{Lx}{Cy} + \frac{Lx}{Cx}\right)\omega^2 + \frac{1}{CxCy} = 0 \tag{21}$$

Consequently, the resonant frequency ωp when the capacitor C10 and the capacitor C20 are connected in parallel in the AC generation circuit 42 can be represented by the following Eq. (22).

$$\omega p^2 = \frac{\left(\frac{2Ls}{Cy} + \frac{Lx}{Cy} + \frac{Lx}{Cx}\right) \pm \sqrt{\left(\frac{2Ls}{Cy} + \frac{Lx}{Cy} + \frac{Lx}{Cx}\right)^2 - \frac{8LsLx}{CxCy}}}{4LsLx} \tag{22}$$

At this time, even if the capacitor C10 and the capacitor C20 are connected in parallel, there are two types of resonant frequencies top if the condition of the following Inequality (23) is satisfied.

$$\left(\frac{2Ls}{Cy} + \frac{Lx}{Cy} + \frac{Lx}{Cx}\right)^2 - \frac{8LsLx}{CxCy} > 0 \tag{23}$$

When the capacitor C10 and the capacitor C20 are connected in parallel in the AC generation circuit 42, there are two types of resonant frequencies ωp even if the capacitance Cx of each of the capacitor C10 and the capacitor C20 is the same as the capacitance Cy of each of the capacitor C11 and the capacitor C21.

From this, in the AC generation circuit 42, it is only necessary to establish the following Eq. (25) so that the resonant frequency ωs of the case where the capacitor C10 and the capacitor C20 are connected in series is the same as the resonant frequency ωp of the case where the capacitor C10 and the capacitor C20 are connected in parallel (the following Eq. (24)).

$$\omega s = \omega p \tag{24}$$

$$\frac{2Ls}{Cx} \pm \sqrt{\left(\frac{2Ls}{Cy} + \frac{Lx}{Cy} + \frac{Lx}{Cx} + \frac{2Ls}{Cx}\right)^2 - \frac{32LsLx}{CxCy}} = \pm\sqrt{\left(\frac{2Ls}{Cy} + \frac{Lx}{Cy} + \frac{Lx}{Cx}\right)^2 - \frac{8LsLx}{CxCy}} \tag{25}$$

Here, when the components included in the above Eq. (25) are replaced as in the following Eqs. (26), the above Eq. (25) is rewritten as in the following Eq. (27).

$$a = \frac{2Ls}{Cy} + \frac{Lx}{Cy} + \frac{Lx}{Cx} \qquad b = \frac{8LsLx}{CxCy} \qquad c = \frac{2Ls}{Cx} \tag{26}$$

$$c \pm \sqrt{(a+c)^2 - 4b} = \pm\sqrt{a^2 - b} \tag{27}$$

Subsequently, when the above Eq. (27) is calculated, the following Eqs. (28) are given.

$$\begin{aligned} &c \pm \sqrt{(a+c)^2 - 4b} = \pm\sqrt{a^2 - b} \\ &\left(c \pm \sqrt{(a+c)^2 - 4b}\right)^2 = a^2 - b \\ &c^2 \pm 2c\sqrt{(a+c)^2 - 4b} + (a+c)^2 - 4b = \\ &a^2 - b \pm \sqrt{(a+c)^2 - 4b} = \frac{-2ac - 2c^2 + 3b}{2c}(a+c)^2 - 4b = \\ &\left(\frac{-2ac - 2c^2 + 3b}{2c}\right)^2 (a^2 + 2ac + c^2 - 4b)4c^2 = \\ &4a^2c^2 + 8ac^3 - 12abc + 4c^4 - 12bc^2 + 9b^2 \\ &12ac = 4c^2 + 9b \end{aligned} \tag{28}$$

When the substitution of the above Eqs. (26) is restored in the above Eqs. (28), the above Eq. (25) is rewritten as shown in the following Eq. (29).

$$12\left(\frac{2Ls}{Cy} + \frac{Lx}{Cy} + \frac{Lx}{Cx}\right)\frac{2Ls}{Cx} = 4\left(\frac{2Ls}{Cx}\right)^2 + 9\frac{8LsLx}{CxCy} \tag{29}$$

Subsequently, when the above Eq. (29) is calculated, the following Eqs. (30) are given.

$$24\left(\frac{2Ls}{Cy}+\frac{Lx}{Cy}+\frac{Lx}{Cx}\right)=\frac{16Ls}{Cx}+72\frac{Lx}{Cy} \tag{30}$$

$$3\left(\frac{2Ls}{Cy}+\frac{Lx}{Cy}+\frac{Lx}{Cx}\right)=\frac{2Ls}{Cx}+9\frac{Lx}{Cy}$$

$$\frac{3Lx}{Cy}+\frac{3Lx}{Cx}-9\frac{Lx}{Cy}=\frac{2Ls}{Cx}-\frac{6Ls}{Cy}$$

$$3Lx\left(\frac{1}{Cx}-\frac{2}{Cy}\right)=Ls\left(\frac{2}{Cx}-\frac{6}{Cy}\right)$$

$$Lx=Ls\frac{2}{3}\frac{\frac{1}{Cx}-\frac{3}{Cy}}{\frac{1}{Cx}-\frac{2}{Cy}}$$

$$Lx=Ls\frac{2}{3}\frac{3Cx-Cy}{2Cx-Cy}$$

From this, it is only necessary to establish the above Eqs. (30) in relationships between the inductance Lx of each of the inductor L10 and the inductor L20 provided in the AC generation circuit 42, the inductance component Ls of the inductance La provided in the battery 30, the capacitance Cx of each of the capacitor C10 and the capacitor C20 provided in the AC generation circuit 42, and the capacitance Cy of each of the capacitor C11 and the capacitor C21. That is, in the AC generation circuit 42, it is only necessary to establish the above Eqs. (30) so that the resonant frequency ωs of the case where the capacitor C10 and the capacitor C20 are connected in series is the same as the resonant frequency ωp of the case where the capacitor C10 and the capacitor C20 are connected in parallel (as shown in the above Eq. (24)).

Here, it is necessary for both the denominator and the numerator of the right side of the above Eqs. (30) to be positive or negative values so that the inductance Lx of each of the inductor L10 and the inductor L20 satisfies the following Inequality (31) as a condition for establishing the AC generation circuit 42 as a circuit. That is, a relationship between the capacitance Cy of each of the capacitor C11 and the capacitor C21 and the capacitance Cx of each of the capacitor C10 and the capacitor C20 needs to be the following Inequality (32) or the following Inequality (33). In other words, when the relationship between the capacitance Cy of each of the capacitor C11 and the capacitor C21 and the capacitance Cx of each of the capacitor C10 and the capacitor C20 is the following Inequality (34), the inductance Lx of each of the inductor L10 and the inductor L20 does not satisfy the following Inequality (31). Because of this, in the AC generation circuit 42, it is difficult for the resonant frequency ωs of the case where the capacitor C10 and the capacitor C20 are connected in series to be the same as the resonant frequency ωp of the case where the capacitor C10 and the capacitor C20 are connected in parallel (as shown in the above Eq. (24)).

$$Lx>0 \tag{31}$$

$$Cy<2Cx \tag{32}$$

$$Cy>3Cx \tag{33}$$

$$2Cx\le Cy\le 3Cx \tag{34}$$

Here, the resonant frequency ωs of the case where the capacitor C10 and the capacitor C20 are connected in series in the AC generation circuit 42 represented by the above Eq. (12) is calculated. First, the inductance Lx of each of the inductor L10 and the inductor L20 present under the root of the numerator in the above Eq. (12) is replaced with that of the above Eqs. (30), i.e., the following Expression (35). Thereby, the value present under the root of the numerator in the above Eq. (12) is expressed by the following Eq. (36).

$$Ls\frac{2}{3}\frac{3Cx-Cy}{2Cx-Cy} \tag{35}$$

$$\begin{aligned}&\left(\frac{2Ls}{Cy}+\frac{Lx}{Cy}+\frac{Lx}{Cx}+\frac{2Ls}{Cx}\right)^2-\frac{32LsLx}{CxCy}=\\&\left(\frac{1}{CxCy}\right)^2\left\{(2Ls(Cx+Cy)+Lx(Cx+Cy))^2-32LsLxCxCy\right\}=\\&\left(\frac{1}{CxCy}\right)^2\left\{\left(2Ls(Cx+Cy)+Ls(Cx+Cy)\frac{2}{3}\left(\frac{3Cx-Cy}{2Cx-Cy}\right)\right)^2-\right.\\&\left.32Ls^2\frac{2}{3}\left(\frac{3Cx-Cy}{2Cx-Cy}\right)CxCy\right\}=\left(\frac{1}{CxCy}\right)^2Ls^2\frac{1}{(2Cx-Cy)^2}\frac{4}{9}\{(81Cx^4-\\&198Cx^3Cy+193Cx^2Cy^2-88CxCy^3+16Cy^4)\}=\\&\left(\frac{1}{CxCy}\right)^2Ls^2\frac{1}{(2Cx-Cy)^2}\frac{4}{9}(9Cx^2-11CxCy+4Cy^2)^2=\\&\left(\frac{2}{3}Ls\frac{9Cx^2-11CxCy+4Cy^2}{CxCy(2Cx-Cy)}\right)^2\end{aligned} \tag{36}$$

When the value under the root of the numerator in the above Eq. (12) is expressed and calculated by the above Eq. (36), the above Eq. (12) is rewritten as shown in the following Eq. (37).

$$\begin{aligned}\omega s^2&=\frac{\left(\frac{2Ls}{Cy}+\frac{Lx}{Cy}+\frac{Lx}{Cx}+\frac{2Ls}{Cx}\right)\pm\left(\frac{2}{3}Ls\frac{9Cx^2-11CxCy+4Cy^2}{CxCy(2Cx-Cy)}\right)}{4LsLx}\\&=\frac{\left(\frac{1}{Cy}+\frac{1}{Cx}\right)2Ls+\left(\frac{1}{Cy}+\frac{1}{Cx}\right)Ls\frac{2}{3}\frac{3Cx-Cy}{2Cx-Cy}\pm\left(\frac{2}{3}Ls\frac{9Cx^2-11CxCy+4Cy^2}{CxCy(2Cx-Cy)}\right)}{4Ls\frac{2}{3}Ls\frac{3Cx-Cy}{2Cx-Cy}}\\&=\frac{1}{4Ls}\frac{9Cx^2+5CxCy-4Cy^2\pm(9Cx^2-11CxCy+4Cy^2)}{(3Cx-Cy)CxCy}\end{aligned} \tag{37}$$

Thereby, the resonant frequency ωs of the case where the capacitor C10 and the capacitor C20 are connected in series in the AC generation circuit 42 is expressed by two types of a first resonant frequency ωs1 represented by the following Eq. (38) and a second resonant frequency ωs2 represented by the following Eq. (39).

$$\begin{aligned}\omega s1^2&=\frac{1}{4Ls}\frac{9Cx^2+5CxCy-4Cy^2+(9Cx^2-11CxCy+4Cy^2)}{(3Cx-Cy)CxCy}\\&=\frac{3}{2LsCy}\end{aligned} \tag{38}$$

$$\begin{aligned}\omega s2^2&=\frac{1}{4Ls}\frac{9Cx^2+5CxCy-4Cy^2-(9Cx^2-11CxCy+4Cy^2)}{(3Cx-Cy)CxCy}\\&=\frac{2}{LsCx}\frac{(2Cx-Cy)}{(3Cx-Cy)}\\&=\frac{4}{3LxCx}\end{aligned} \tag{39}$$

Subsequently, the resonant frequency ωp of the case where the capacitor C10 and the capacitor C20 are connected in parallel in the AC generation circuit 42 represented by the above Eq. (22) is calculated. Here, first, the inductance Lx of each of the inductor L10 and the inductor L20 present under the root of the numerator in the above Eq. (22) is replaced with that of the above Eqs. (30), i.e., the above Expression (35). Thereby, a value present under the root of the numerator in the above Eq. (22) is expressed by the following Eq. (40).

$$\left(\frac{2Ls}{Cy}+\frac{Lx}{Cy}+\frac{Lx}{Cx}\right)^2-\frac{8LsLx}{CxCy}= \tag{40}$$

$$\left(\frac{1}{CxCy}\right)^2\left\{(2LsCx+Lx(Cx+Cy))^2-8LsLxCxCy\right\}=$$

$$\left(\frac{1}{CxCy}\right)^2\left\{\left(2LsCx+Ls(Cx+Cy)\frac{2}{3}\left(\frac{3Cx-Cy}{2Cx-Cy}\right)\right)^2-\right.$$

$$\left.8Ls^2\frac{2}{3}\left(\frac{3Cx-Cy}{2Cx-Cy}\right)CxCy\right\}=\left(\frac{1}{CxCy}\right)^2Ls^2\frac{1}{(2Cx-Cy)^2}\frac{4}{9}\left\{\left(81Cx^4-\right.\right.$$

$$\left.\left.90Cx^3Cy+43Cx^2Cy^2-10CxCy^3+Cy^4\right)\right\}=$$

$$\left(\frac{1}{CxCy}\right)^2Ls^2\frac{1}{(2Cx-Cy)^2}\frac{4}{9}\left(9Cx^2-5CxCy+Cy^2\right)^2=$$

$$\left(\frac{2}{3}Ls\frac{9Cx^2-5CxCy+Cy^2}{CxCy(2Cx-Cy)}\right)^2$$

When the value present under the root of the numerator in the above Eq. (22) is expressed and calculated by the above Eq. (40), the above Eq. (22) is rewritten as shown in the following Eq. (41).

$$\omega p^2=\frac{\left(\frac{2Ls}{Cy}+\frac{Lx}{Cy}+\frac{Lx}{Cx}\right)\pm\left(\frac{2}{3}Ls\frac{9Cx^2-5CxCy+Cy^2}{CxCy(2Cx-Cy)}\right)}{4LsLx} \tag{41}$$

$$=\frac{\left(\frac{1}{Cy}\right)2Ls+\left(\frac{1}{Cy}+\frac{1}{Cx}\right)Ls\frac{2}{3}\frac{3Cx-Cy}{2Cx-Cy}\pm\left(\frac{2}{3}Ls\frac{9Cx^2-5CxCy+Cy^2}{CxCy(2Cx-Cy)}\right)}{4Ls\frac{2}{3}Ls\frac{3Cx-Cy}{2Cx-Cy}}$$

$$=\frac{1}{4Ls}\frac{9Cx^2+CxCy-Cy^2\pm\left(9Cx^2-5CxCy+Cy^2\right)}{(3Cx-Cy)CxCy}$$

Thereby, the resonant frequency ωp of the case where the capacitor C10 and the capacitor C20 are connected in parallel in the AC generation circuit 42 is expressed by two types of a first resonant frequency ωp1 represented by the following Eq. (42) and a second resonant frequency ωp2 represented by the following Eq. (43).

$$\omega p1^2=\frac{1}{4Ls}\frac{9Cx^2-CxCy-Cy^2+\left(9Cx^2-5CxCy+Cy^2\right)}{(3Cx-Cy)CxCy} \tag{42}$$

$$=\frac{3}{2LsCy}$$

$$\omega p2^2=\frac{1}{4Ls}\frac{9Cx^2-CxCy-Cy^2-\left(9Cx^2-5CxCy+Cy^2\right)}{(3Cx-Cy)CxCy} \tag{43}$$

$$=\frac{1}{2LsCx}\frac{(2Cx-Cy)}{(3Cx-Cy)}$$

-continued $$=\frac{1}{3LxCx}$$

It can be seen from the first resonant frequency ωp1 represented by the above Eq. (42) and the first resonant frequency cost represented by the above Eq. (38) that the resonant frequency ωs of the case where the capacitor C10 and the capacitor C20 are connected in series is the same as the resonant frequency ωp of the case where the capacitor C10 and the capacitor C20 are connected in parallel.

Here, a magnitude relationship between a first resonant frequency ω1 and a second resonant frequency ω2 will be described. First, when the capacitor C10 and the capacitor C20 are connected in series in the AC generation circuit 42, the magnitude relationship between the resonant frequency ωs1 represented by the above Eq. (38) and the resonant frequency ωs2 represented by the above Eq. (39) will be described.

The magnitude relationship between the resonant frequency ωs1 and the resonant frequency ωs2 is expressed from the above Eq. (38) and the above Eq. (39) as shown in the following Eqs. (44).

$$\omega s1^2-\omega s2^2=\frac{1}{2Ls}\frac{9Cx^2-11CxCy+4Cy^2}{CxCy(3Cx-Cy)} \tag{44}$$

$$9Cx^2-11CxCy+4Cy^2=(3Cx-2Cy)^2+CxCy>0$$

Here, because the left side of the above Eq. (44) (the following Expression (45)) is positive all the time, the magnitude relationship between the resonant frequency ωs1 and the resonant frequency ωs2 can be determined according to a relationship between the capacitance Cx of each of the capacitor C10 and the capacitor C20 and the capacitance Cy of each of the capacitor C11 and the capacitor C21. More specifically, the magnitude relationship between the resonant frequency ωs1 and the resonant frequency ωs2 becomes the following Inequality (47) if the relationship between the capacitance Cx and the capacitance Cy is the following Inequality (46) and the magnitude relationship between the resonant frequency ωs1 and the resonant frequency ωs2 becomes the following Inequality (49) if the relationship between the capacitance Cx and the capacitance Cy is the following Inequality (48).

$$9Cx^2-11CxCy+4Cy^2 \tag{45}$$

$$Cy>3Cx \tag{46}$$

$$\omega s1<\omega s2 \tag{47}$$

$$Cy<2Cx \tag{48}$$

$$\omega s1>\omega s2 \tag{49}$$

In this regard, as described above, when the capacitor C10 and the capacitor C20 are connected in series in the AC generation circuit 42, the resonant frequency ωs1 is absent if the capacitance Cx of each of the capacitor C10 and the capacitor C20 is the same as the capacitance Cx of each of the capacitor C11 and the capacitor C21 (the following Eq. (50)). That is, when the capacitance Cx is the same as the capacitance Cy, only one type of resonant frequency ωs2 is given.

$$Cy=Cx \tag{50}$$

Subsequently, when the capacitor C10 and the capacitor C20 are connected in parallel in the AC generation circuit 42, the magnitude relationship between the resonant frequency (opt represented by the above Eq. (42) and the resonant frequency ωp2 represented by the above Eq. (43) will be described.

The magnitude relationship between the resonant frequency (opt and the resonant frequency ωp2 is expressed as shown in the following Eqs. (51) from the above Eq. (42) and the above Eq. (43).

$$\omega p1^2 - \omega p2^2 = \frac{1}{2Ls}\frac{9Cx^2 - 5CxCy + Cy^2}{CxCy(3Cx - Cy)} \tag{51}$$

$$9Cx^2 - 5CxCy + Cy^2 = (3Cx - Cy)^2 + CxCy > 0$$

Here, because the left side of the above Eq. (51) (the following Expression (52)) is also positive all the time, the magnitude relationship between the resonant frequency ωp1 and the resonant frequency ωp2 is also determined according to the relationship between the capacitance Cx of each of the capacitor C10 and the capacitor C20 and the capacitance Cy of each of the capacitor C11 and the capacitor C21. More specifically, the magnitude relationship between the resonant frequency ωp1 and the resonant frequency ωp2 becomes the following Inequality (54) if the relationship between the capacitance Cx and the capacitance Cy is the following Inequality (53) and the magnitude relationship between the resonant frequency ωp1 and the resonant frequency ωp2 becomes the following Inequality (56) if the relationship between the capacitance Cx and the capacitance Cy is the following Inequality (55).

$$9Cx^2 - 5CxCy + Cy^2 \tag{52}$$

$$Cy > 3Cx \tag{53}$$

$$\omega p1 < \omega p2 \tag{54}$$

$$Cy < 2Cx \tag{55}$$

$$\omega p1 > \omega p2 \tag{56}$$

Figure 7:
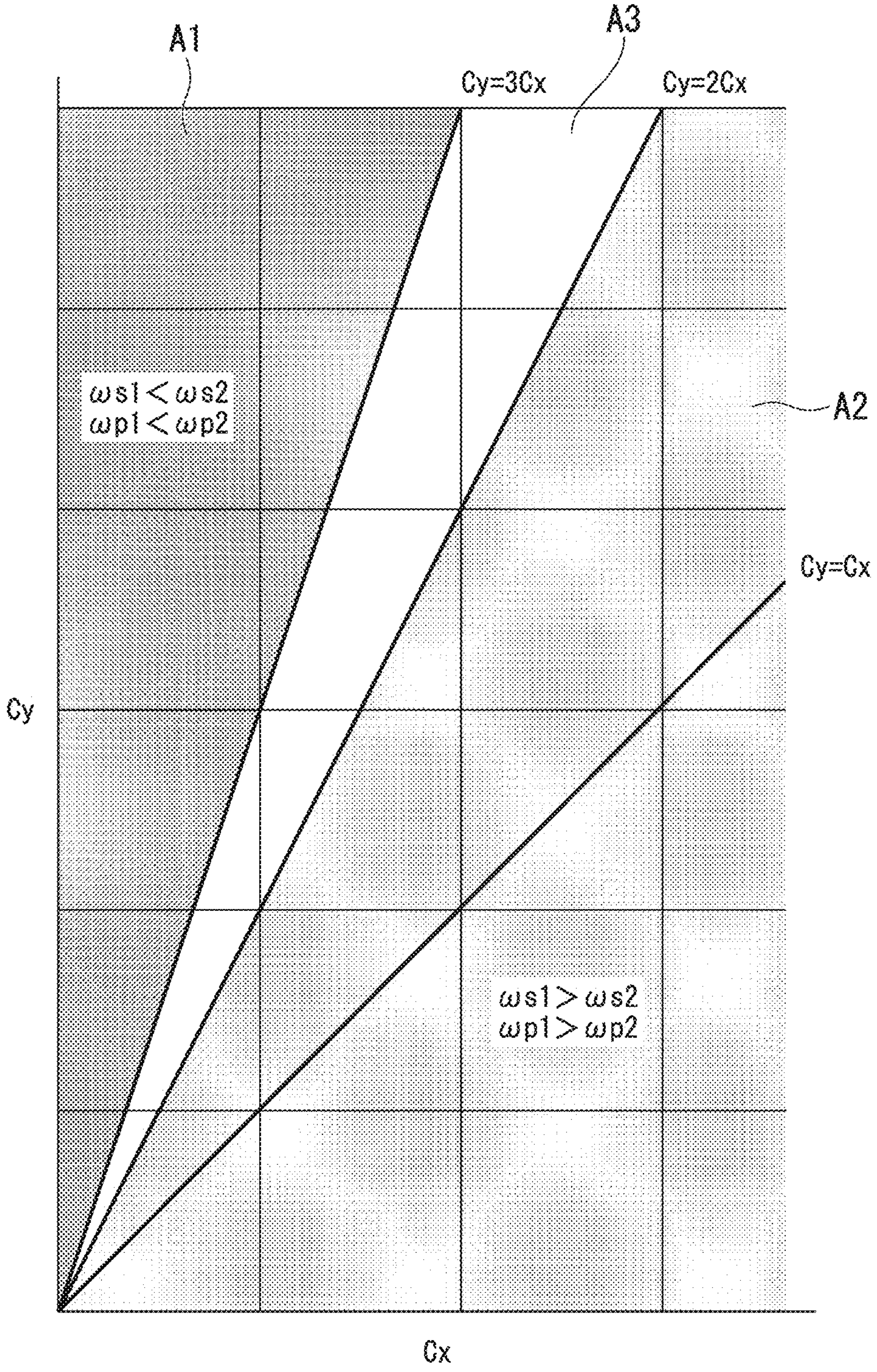
FIG. 7 is a diagram showing an example of a relationship between the capacitance of a capacitor and the resonant frequency in the AC generation circuit of the embodiment.

The above-described relationship between the capacitance Cx and the capacitance Cy and the above-described magnitude relationship between the first resonant frequency ω1 and the second resonant frequency ω2 are expressed as shown in FIG. 7. FIG. 7 is a diagram showing an example of a relationship between the capacitance (the capacitance Cx and the capacitance Cy) of the capacitor and the resonant frequency (the resonant frequency ω1 and the resonant frequency ω2) in the AC generation circuit 42 of the embodiment.

As shown in FIG. 7, in a first region A1 where the relationship between the capacitance Cx and the capacitance Cy satisfies the above Inequality (33), the above Inequality (46), and the above Inequality (53) separated by the following Eq. (57), there are two types of resonant frequencies ω and the magnitude relationship between the resonant frequency ω1 and the resonant frequency ω2 becomes the above Inequality (47) and the above Inequality (54). As shown in FIG. 7, in a second region A2 where the relationship between the capacitance Cx and the capacitance Cy satisfies the above Inequality (32), the above Inequality (48), and the above Inequality (55) separated by the following Eq. (58), there are two types of resonant frequencies ω and the magnitude relationship between the resonant frequency ω1 and the resonant frequency ω2 becomes the above Inequality (49) and the above Inequality (56). As shown in FIG. 7, when the relationship between the capacitance Cx and the capacitance Cy is the above Eq. (50) in the second region A2, the resonant frequency ω of the case where the capacitor C10 and the capacitor C20 are connected in series is only the resonant frequency ωs2 as described above. Furthermore, as shown in FIG. 7, in a third region A3 where the relationship between the capacitance Cx and the capacitance Cy satisfies the above Inequality (34) separated by the following Eq. (57) and the following Eq. (58), the resonant frequency ω is absent when the capacitor C10 and the capacitor C20 are connected in series with and parallel to the battery 30 in the AC generation circuit 42.

$$Cy = 3Cx \tag{57}$$

$$Cy = 2Cx \tag{58}$$

Thus, in the AC generation circuit 42, in each of the first region A1 and the second region A2 where the relationship between the capacitance Cx and the capacitance Cy is shown in FIG. 7, the resonant frequency ω of the AC current to be generated can be the same between the cases where the capacitor C10 and the capacitor C20 are connected in series with and in parallel to the battery 30 in the AC generation circuit 42.

Meanwhile, if the temperature of the battery 30 mounted in the vehicle 1 is raised by the temperature raising device 40, there is one type of resonant frequency ωs in the case where the capacitor C10 and the capacitor C20 are connected in series when the capacitance Cx and the capacitance Cy are equal, but the relationship in the second region A2 shown in FIG. 7 is considered to be more preferable in the relationship between the capacitance Cx and the capacitance Cy. This is because when the relationship between the capacitance Cx and the capacitance Cy is set as the relationship in the first region A1 shown in FIG. 7, the resonant frequency ω1 on the side where the resonant frequency ω is low is equal between the cases where the capacitor C10 and the capacitor C20 are connected in series with and in parallel to the battery 30. Also, this is because, when the resonant frequency ω1 on the side where the resonant frequency ω is low is equal, an electric current waveform of the AC current generated by the AC generation circuit 42 may be affected by an unequal resonant frequency ω2 in which the resonant frequency ω is high.

The AC generation circuit 42 can generate AC currents having two types of resonant frequencies ω in the cases where the capacitor C10 and the capacitor C20 are connected in series with and in parallel to the battery 30 by making an adjustment (a determination) so that the inductance Lx of each of the inductor L10 and the inductor L20 satisfies a relational equation represented by the following Eq. (59). More specifically, the AC generation circuit 42 can generate AC currents having two types of resonant frequencies cos that are the resonant frequency ωs1 and the resonant frequency ωs2 represented by the following Eqs. (60) when the capacitor C10 and the capacitor C20 are connected in series and can generate AC currents having two types of resonant frequencies top that are the resonant frequency ωp1 and the resonant frequency ωp2 represented by the following Eqs. (61) when the capacitor C10 and the capacitor C20 are connected in parallel.

$$Lx = Ls\frac{2}{3}\frac{3Cx - Cy}{2Cx - Cy} \tag{59}$$

-continued $$\omega s1 = \sqrt{\frac{3}{2LsCy}} \quad (60)$$

$$\omega s2 = \sqrt{\frac{4}{3LxCx}}$$

$$\omega p1 = \sqrt{\frac{3}{2LsCy}} \quad (61)$$

$$\omega p2 = \sqrt{\frac{1}{3LxCx}}$$

Moreover, for example, the AC generation circuit 42 can cause the resonant frequency cost of the AC current generated when the capacitor C10 and the capacitor C20 are connected in series to be the same as the resonant frequency (opt of the AC current generated when the capacitor C10 and the capacitor C20 are connected in parallel.

[Examples of Resonant Frequency of AC Current]

Figure 8:
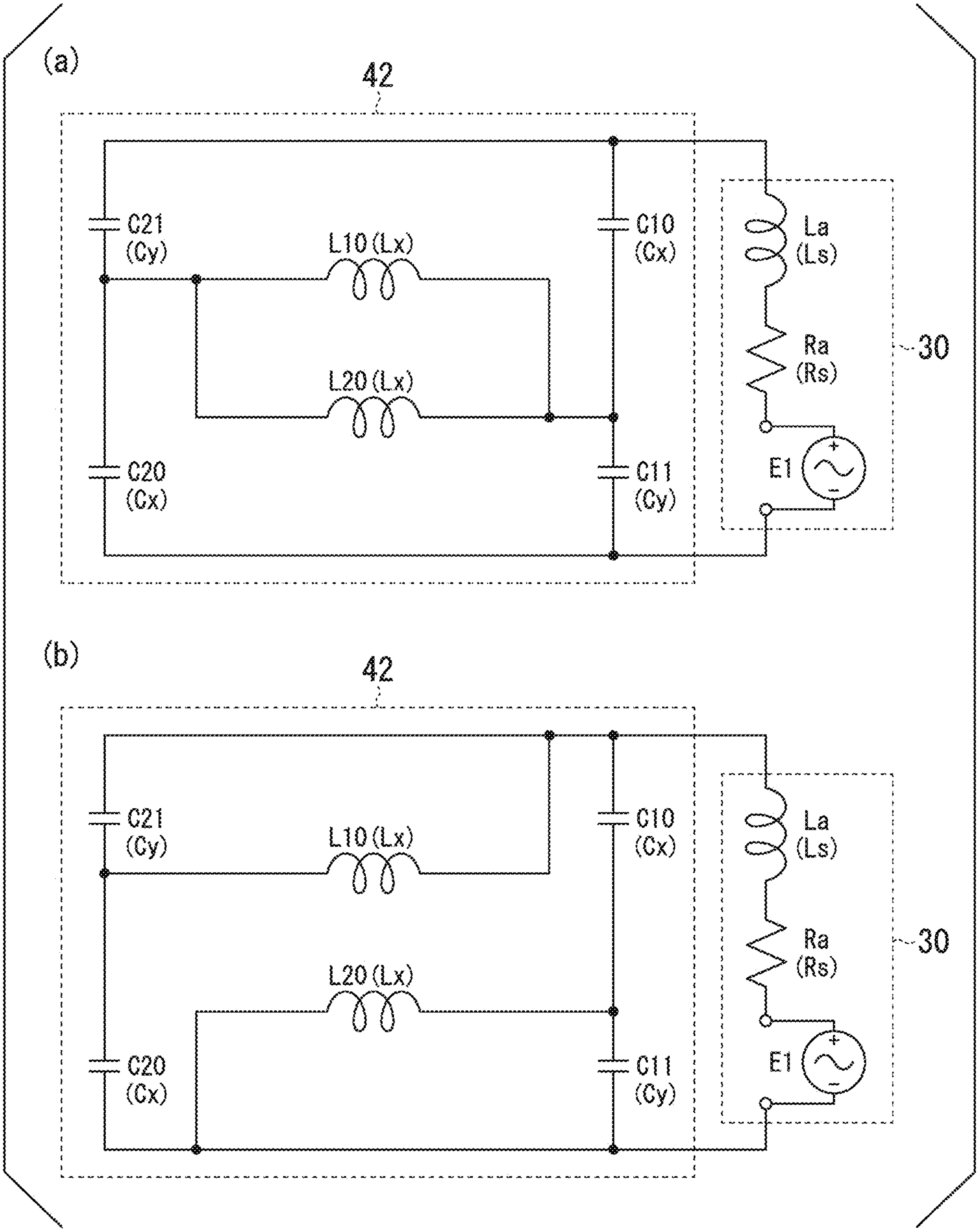
FIG. 8 is an example of an equivalent circuit for describing the resonant frequency of an AC current generated in the AC generation circuit of the embodiment.

Here, an example of the resonant frequency ω of the AC current generated by the AC generation circuit 42 will be described. FIG. 8 is an example of an equivalent circuit for describing the resonant frequency ω of an AC current generated in the AC generation circuit 42 of the embodiment. In FIG. 8, an equivalent circuit of a case where a prescribed AC voltage is supplied from an AC power supply E1 to the AC generation circuit 42 instead of the battery 30 is shown. In (a) of FIG. 8, an equivalent circuit of a case where the capacitor C10 and the capacitor C20 are connected in series is shown. In (b) of FIG. 8, an equivalent circuit of a case where the capacitor C10 and the capacitor C20 are connected in parallel is shown.

Figure 9:
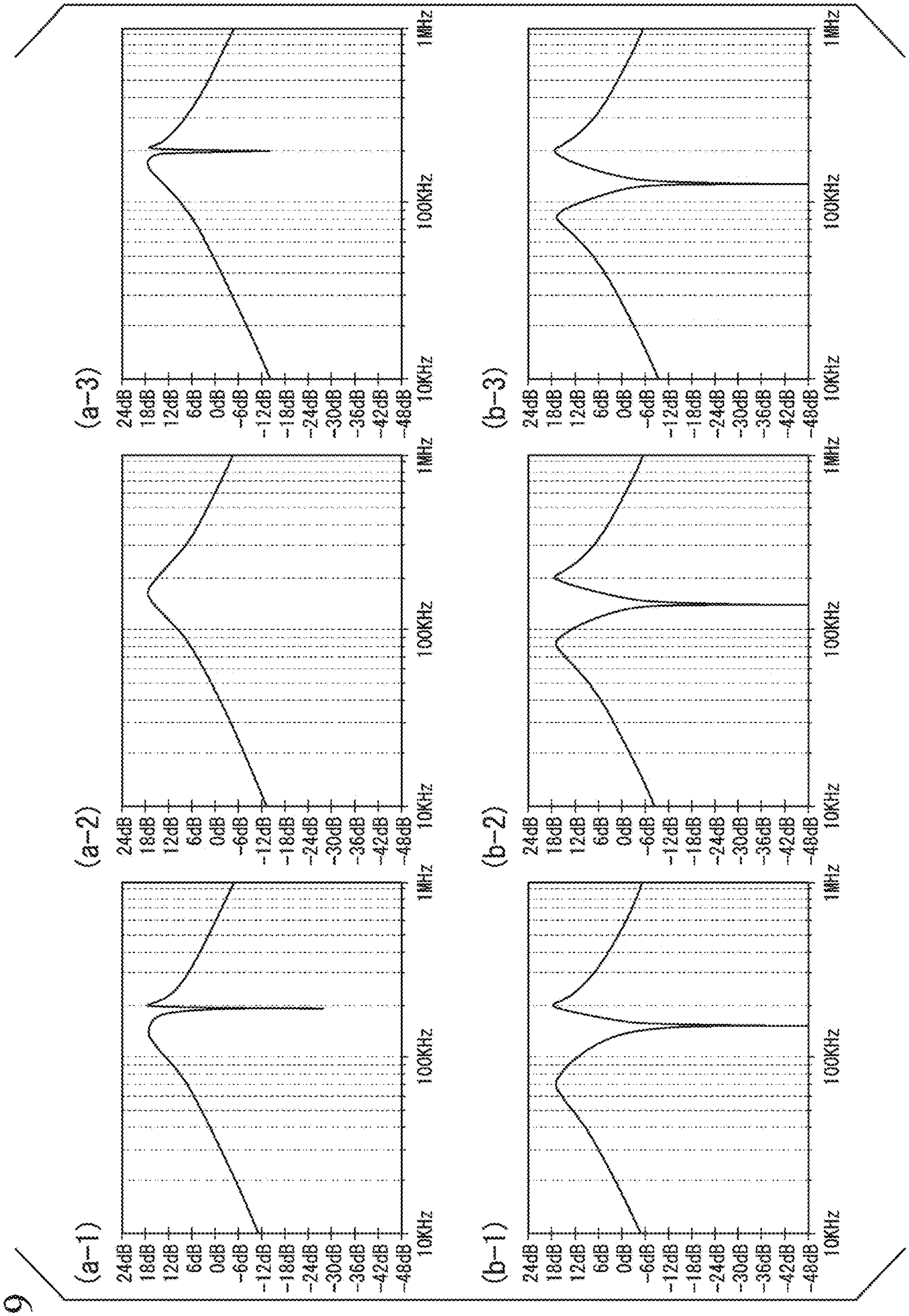
FIG. 9 is a diagram showing an example of frequency characteristics of an AC current generated in the AC generation circuit of the embodiment.

FIG. 9 is a diagram showing an example of frequency characteristics (simulation characteristics) of the AC current generated in the AC generation circuit 42 of the embodiment. In (a-1) to (a-3) of FIG. 9, examples of the frequency characteristics when the capacitor C10 and the capacitor C20 are connected in series are shown. In (b-1) to (b-3) of FIG. 9, examples of the frequency characteristics when the capacitor C10 and the capacitor C20 are connected in parallel are shown. In (a-1) to (a-3) of FIGS. 9 and (b-1) to (b-3) of FIG. 9, the horizontal axis represents a frequency and the vertical axis represents a gain of an AC current to be generated.

The example of the frequency characteristics shown in FIG. 9 is an example in which the relationship between the capacitance Cx and the capacitance Cy is set as the relationship in the second region A2 shown in FIG. 7 and the resonant frequency cost or ωp1 on the side where the resonant frequency ω of the AC current to be generated is high is set to 200 [kHz] in each equivalent circuit shown in FIG. 8. Because one type of resonant frequency ωs is shown in the case where the capacitor C10 and the capacitor C20 are connected in series when the capacitance Cx and the capacitance Cy are equal in the second region A2 shown in FIG. 7 in FIG. 9, the resonant frequency ω1 is maintained at 200 [kHz] by appropriately adjusting the inductance component Ls, the inductance Lx, the capacitance Cx, and the capacitance Cy on the basis of a relational equation represented by the above Eq. (59). (b-1) and (a-1) of FIGS. 9, (b-2) and (a-2) of FIG. 9, and (b-3) and (a-3) of FIG. 9 show frequency characteristics in the same inductance component Ls, the same inductance Lx, the same capacitance Cx, and the same capacitance Cy.

As shown in (a-1) of FIGS. 9 and (b-1) of FIG. 9, it can be seen that there are two peak points in both cases where the capacitor C10 and the capacitor C20 are connected in series and in parallel and therefore there are two resonant frequencies ω at the two peak points. From this state, it can be seen that there is one peak point and there is one type of resonant frequency ω in the case where the capacitor C10 and the capacitor C20 are connected in series as shown in (a-2) of FIG. 9 if the capacitance Cy is the same as the capacitance Cx when the capacitance Cy is set to a constant value and the value of the capacitance Cx is reduced. On the other hand, as shown in (b-2) of FIG. 9, it can be seen that two peak points remain and there are still two resonant frequencies ω in the case where the capacitor C10 and the capacitor C20 are connected in parallel. Furthermore, from this state, it can be seen that there are two peak points in both cases where the capacitor C10 and the capacitor C20 are connected in series and in parallel and therefore there are two resonant frequencies ω at the two peak points as shown in (a-3) of FIGS. 9 and (b-3) of FIG. 9 if the capacitance Cy is not the same as the capacitance Cx when the capacitance Cy is set to a constant value and the value of the capacitance Cx is reduced.

Thus, it can be seen that one type of resonant frequency ωs is provided when the capacitance Cy is the same as the capacitance Cx if the capacitor C10 and the capacitor C20 are connected in series in the AC generation circuit 42. However, the AC generation circuit 42 includes four capacitors C: a capacitor C10, a capacitor C11, a capacitor C20, and a capacitor C21. Thus, in the actual AC generation circuit 42, it may be difficult for two capacitors C (the capacitor C10 and the capacitor C20) having the capacitance Cx and two capacitors C (the capacitor C11 and the capacitor C21) having the capacitance Cy to have the same capacitance. This is because the actual capacitor is a component with a wide tolerance range of capacitance included in the standard, even if it is a capacitance within the same standard, i.e., a capacitor is a component with large variations in characteristics. Thus, in the actual AC generation circuit 42, the case where one type of resonant frequency ωs is provided when the capacitor C10 and the capacitor C20 are connected in series may be less common.

In the AC generation circuit 42, for example, if a configuration in which a plurality of batteries 30 are combined is adopted for the battery 30 mounted in the vehicle 1, it is possible to reduce the total voltage fluctuation when the temperature of the battery 30 is raised by connecting AC generation circuits 42 to the batteries 30 and providing a prescribed phase difference between electric current waveforms of the AC currents generated by the AC generation circuits 42. That is, it is possible to reduce the total voltage fluctuation when the temperature of the battery 30 is raised by shifting the phase of the electric current waveform of the AC current generated by each AC generation circuit 42 by a prescribed phase between the AC generation circuits 42. For example, if a configuration in which two batteries 30 are combined is adopted for the battery 30 mounted in the vehicle 1, it is possible to reduce the total voltage fluctuation when the temperature of the battery 30 is raised by shifting the phase of the electric current waveform of the AC current generated by the AC generation circuit 42 connected to each battery 30 by 180°. For example, if a configuration in which three batteries 30 are combined is adopted for the battery 30 mounted in the vehicle 1, it is possible to reduce the total voltage fluctuation when the temperature of the battery 30 is raised by shifting the phase of the electric current waveform of the AC current generated by the AC generation circuit 42 connected to each battery 30 by 120°. This is because the electric current waveform of the AC current generated by each AC generation circuit 42 is an electric current waveform close to a waveform of a symmetrical sinusoidal wave at the time of the positive current value and at the time of the negative (negative) current value. Thereby, the temperature raising device 40 can efficiently raise the temperature of the battery 30.

[Operation of Temperature Raising Device]

Next, an example of the operation of the temperature raising device 40 will be described. Here, a case where batteries 30 mounted in the vehicle 1 has a configuration in which two batteries 30 (a battery 30*a* and a battery 30*b*) are combined will be described. In this case, the temperature is raised by connecting one AC generation circuit 42 to each battery 30 and applying a generated AC current thereto (or causing the generated AC current to flow therethrough). At this time, the controller 44 reduces the total voltage fluctuation (so-called voltage waveform ripple) associated with a voltage output by a set of two batteries 30 by performing a control process so that a phase of an AC current to be generated by each AC generation circuit 42 is shifted by a prescribed phase (here, the phase is shifted by 180°). In other words, the controller 44 reduces the total voltage fluctuation when the temperatures of the two batteries 30 are raised by shifting the timing of the control signal CS and inputting the control signal CS to each AC generation circuit 42 so that each AC generation circuit 42 operates in the opposite direction. The battery 30*a* is an example of a "first power storage" and the battery 30*b* is an example of a "second power storage."

Operation of Temperature Raising Device in Comparative Example

Figure 10:
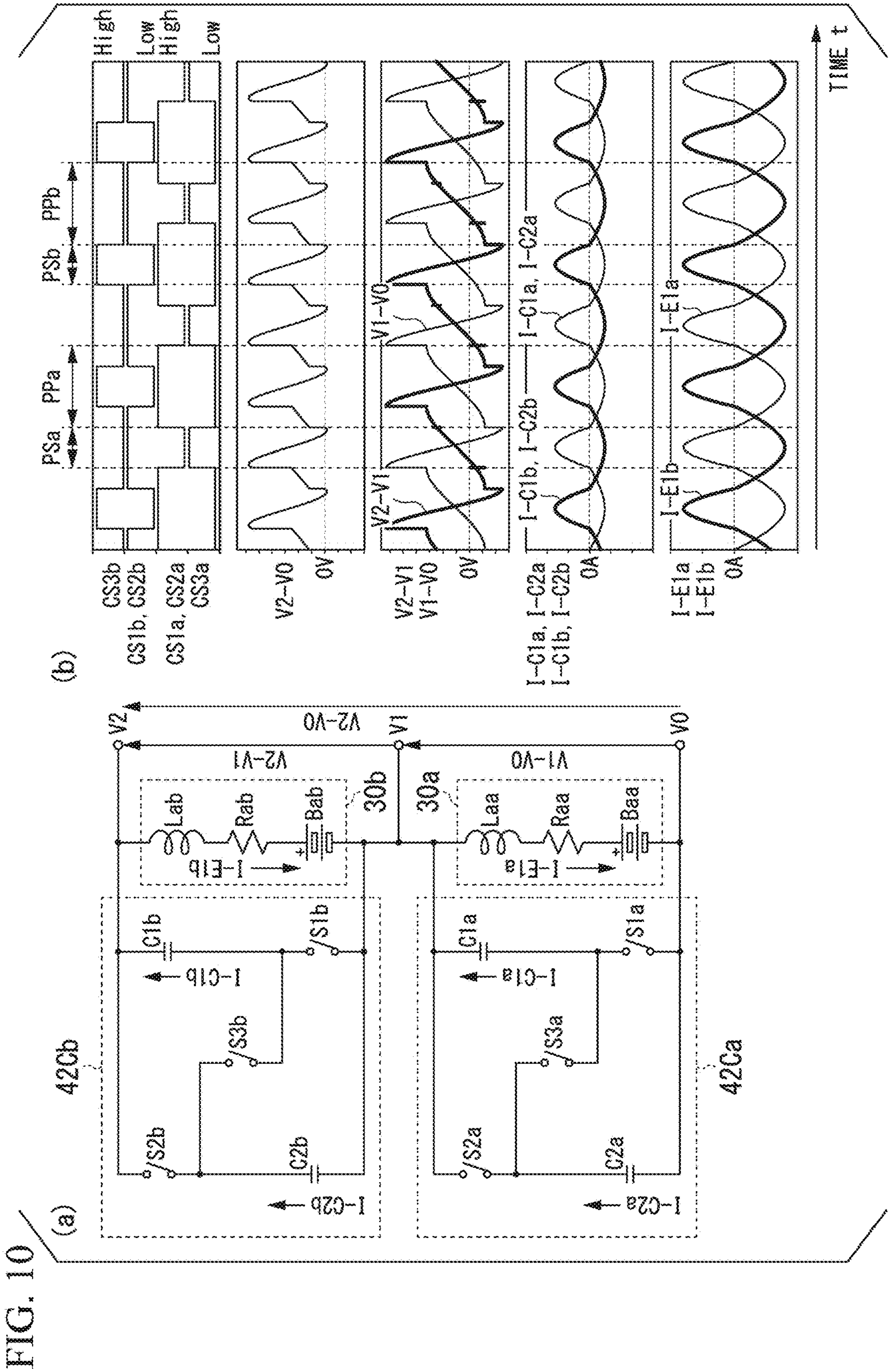
FIG. 10 is a diagram showing an example of operating waveforms of a temperature raising device adopting the AC generation circuit of the comparative example.

First, the operation of the temperature raising device (the temperature raising device 40C) adopting the AC generation circuit 42C of the comparative example shown in FIG. 5 for the comparison with the operation of the temperature raising device 40 will be described. FIG. 10 is a diagram showing an example of an operating waveform (a simulation waveform) of the temperature raising device 40C adopting the AC generation circuit 42C of the comparative example. FIG. 10 is an example of a case where the resonant frequency ω of the AC current generated in the AC generation circuit 42C is 200 [kHz].

In (a) of FIG. 10, the connections of AC generation circuits 42C (an AC generation circuit 42Ca and an AC generation circuit 42Cb) corresponding to the batteries 30 and the AC currents flowing through the AC generation circuits 42C are shown. In (b) of FIG. 10, an example of a control signal output to each switch by the controller 44, an AC current within each AC generation circuit 42C, and a change in the output voltage is shown. In FIG. 10, "a" given at the end of each reference sign indicates the correspondence to the AC generation circuit 42Ca and "b" indicates the correspondence to the AC generation circuit 42Cb.

As shown in (a) of FIG. 10, in the case of a configuration in which two batteries 30 are combined, the AC generation circuit 42Ca is connected to one battery 30*a* and the AC generation circuit 42Cb is connected to the other battery 30*b*. The controller 44 outputs a control signal to a switch provided in each AC generation circuit 42C so that the phase of the AC current generated by each AC generation circuit 42C becomes a phase shifted by 180°. In (a) of FIG. 10, an example of a voltage measurement position and an electric current flow direction changed in each AC generation circuit 42C by the controller 44 controlling each switch according to a control signal is shown. More specifically, a voltage V1-V0 between the two electrodes of the battery 30*a* (including inductance Laa), a current I-C1*a* flowing through the capacitor C1*a*, a current I-C2*a* flowing through the capacitor C2*a*, and a current I-Ela flowing through the battery 30*a* (including the inductance Laa) are shown as an example of a voltage and a current corresponding to the AC generation circuit 42Ca. Furthermore, a voltage V2-V1 between the electrodes of the battery 30*b* (including inductance Lab), a current I-C1*b* flowing through the capacitor C1*b*, a current I-C2*b* flowing through the capacitor C2*b*, and a current I-E1*b* flowing through the battery 30*b* (including the inductance Lab) are shown as an example of a voltage and a current corresponding to the AC generation circuit 42Cb. In (a) of FIG. 10, as a total voltage obtained by combining the battery 30*a* and the battery 30*b*, a voltage V2-V0 between two ends that are one end (V0) of the negative electrode side of the battery 30*a* in the AC generation circuit 42Ca and one end (V2) of the positive electrode side of the battery 30*b* in the AC generation circuit 42Cb is shown.

In (b) of FIG. 10, an example of changes in a control signal CS for controlling each AC generation circuit 42C in the controller 44 and currents and voltages in the AC generation circuit 42Ca and the AC generation circuit 42Cb is shown. In (b) of FIG. 10, it is assumed that the controller 44 sets the corresponding switch in the conductive state by setting each control signal CS at a "High" level and sets the corresponding switch in the non-conductive state by setting each control signal CS at a "Low" level. In the AC generation circuit 42C, as described above, the resonant frequency ωs of the case where the capacitor C1 and the capacitor C2 are connected in series is twice the resonant frequency ωp of the case where the capacitor C1 and the capacitor C2 are connected in parallel. Thus, in (b) of FIG. 10, the controller 44 outputs a control signal CS to each switch at a duty ratio of 1:2.

In (b) of FIG. 10, an example of changes in the voltage V1-V0, the current I-C1*a*, the current I-C2*a*, and the current I-Ela changed by the controller 44 controlling a control signal CS1*a*, a control signal CS2*a*, and a control signal CS3*a* with respect to the AC generation circuit 42Ca is shown. Furthermore, in (b) of FIG. 10, an example of changes in the voltage V2-V1, the current I-C1*b*, and the current I-C2*b*, and the current I-E1*b* changed by the controller 44 controlling a control signal CS1*b*, a control signal CS2*b*, and a control signal CS3*b* with respect to the AC generation circuit 42Cb is shown. In (b) of FIG. 10, an example of a change in the voltage V2-V0 is shown.

As shown in (b) of FIG. 10, in a period PSa, the controller 44 sets the control signal CS1*a* and the control signal CS2*a* of the AC generation circuit 42Ca at the "Low" level and sets the control signal CS3*a* at the "High" level. Thereby, in the AC generation circuit 42Ca, the capacitor C1*a* and the capacitor C2*a* are connected in series with the battery 30*a* and the current I-C1*a* and the current I-C2*a* flow in the positive region, such that the current I-Ela also flows in the positive region. Thereby, the voltage V1-V0 of the AC generation circuit 42Ca decreases from a positive peak voltage to a negative peak voltage. On the other hand, in a period PPa, the controller 44 sets the control signal CS1*a* and the control signal CS2*a* of the AC generation circuit 42Ca at the "High" level and sets the control signal CS3*a* at the "Low" level. Thereby, in the AC generation circuit 42Ca, the capacitor C1*a* and the capacitor C2*a* are connected in parallel to the battery 30*a* and the current I-C1*a* and the current I-C2*a* flow in the negative region, such that the current I-Ela also flows in the negative region. Thereby, the voltage V1-V0 of the AC generation circuit 42Ca increases from the negative peak voltage to the positive peak voltage.

As shown in (b) of FIG. 10, even in the AC generation circuit 42Cb, the controller 44 controls the control signal CS1*b*, the control signal CS2*b*, and the control signal CS3*b* in a period PSb and a period PPb. Thereby, even in the AC generation circuit 42Cb, as in the AC generation circuit 42Ca, the current I-C1*b* and the current I-C2*b* flow and therefore the current I-E1*b* flows similarly. In this regard, as described above, the controller 44 outputs the control signals CS so that the phases of the AC currents generated by the AC generation circuits 42C are shifted by 180° from each other. Thus, the phases of the current I-C1*b* and the current I-C2*b* or the current I-E1*b* flowing in the AC generation circuit 42Cb are shifted by 180° from the phases of the current I-C1*a* and the current I-C2*a* or the current I-Ela flowing in the AC generation circuit 42Ca. Thereby, the phase of the voltage V2-V1 of the AC generation circuit 42Cb is also shifted by 180° from the phase of the voltage V1-V0 of the AC generation circuit 42Ca.

Thus, in the temperature raising device 40C, the controller 44 outputs the control signal CS to each switch at a duty ratio of 1:2, such that the voltage V2-V0 becomes a sum of the voltage V1-V0 of the AC generation circuit 42Ca and the voltage V2-V1 of the AC generation circuit 42Cb as shown in (b) of FIG. 10. However, as can be seen from the waveform of the voltage V2-V0 shown in (b) of FIG. 10, the amplitude is narrower than the amplitude of the voltage V1-V0 or the voltage V2-V1, but the voltage waveform is not close to a waveform of a sinusoidal wave. This is because the controller 44 switches the connection of the capacitor C1 and the capacitor C2 to the battery 30 at a duty ratio of 1:2 to the series connection or the parallel connection, such that the electric current waveform of the AC current (the current I-Ela or the current I-E1*b*) generated by each AC generation circuit 42C does not become a waveform of a sinusoidal wave and the amplitude of the AC current is also different between the positive region and the negative region, i.e., asymmetry in the positive region and the negative region.

Figure 11:
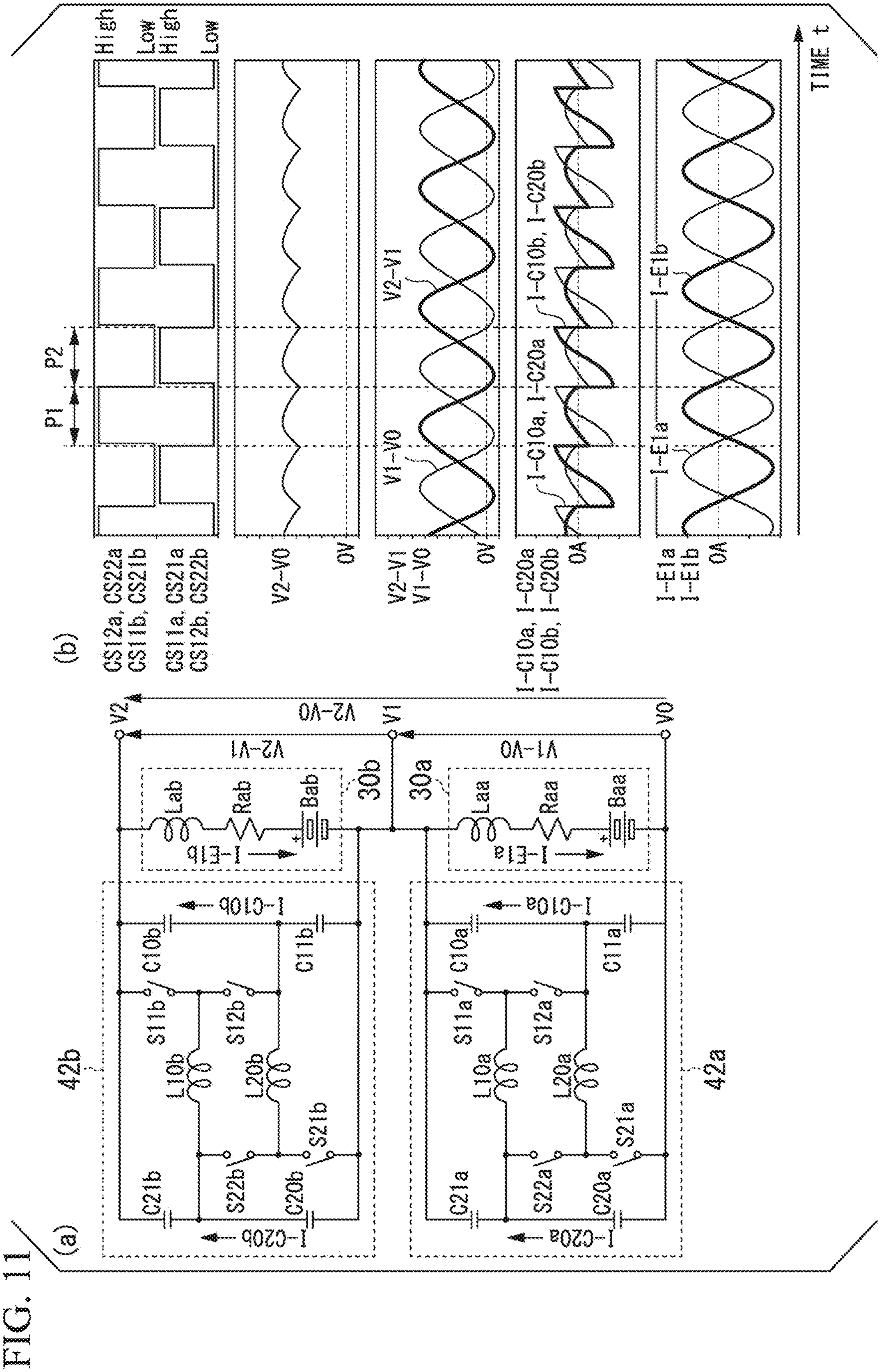
FIG. 11 is a diagram showing an example of operating waveforms of a temperature raising device adopting the AC generation circuit of the embodiment.

Next, the operation of the temperature raising device 40 will be described. FIG. 11 is a diagram showing an example of an operating waveform (a simulation waveform) of the temperature raising device 40 adopting the AC generation circuit 42 of the embodiment. FIG. 11 is an example in which the relationship between the capacitance Cx of each of the capacitors C10 and C20 and the capacitance Cy of each of the capacitors C11 and C21 becomes the following Inequality (62) and the resonant frequency ω of the AC current generated by the AC generation circuit 42 is set to 200 [kHz] as in an example of the operating waveform of the AC generation circuit 42C of the comparative example shown in FIG. 10.

$$Cy<Cx \quad (62)$$

In (a) of FIG. 11, the connections of the AC generation circuits 42 (the AC generation circuit 42*a* and the AC generation circuit 42*b*) corresponding to the batteries 30 and the AC currents flowing in the AC generation circuits 42 are shown. In (b) of FIG. 11, an example of changes in a control signal output to each switch by the controller 44 and an AC current and an output voltage in each AC generation circuit 42 is shown. In FIG. 11, "a" given at the end of each reference sign indicates the correspondence to the AC generation circuit 42*a* and "b" indicates the correspondence to the AC generation circuit 42*b*. The AC generation circuit 42*a* is an example of an "AC generation circuit" and the AC generation circuit 42*b* is an example of a "second AC generation circuit." The AC current generated by the AC generation circuit 42*a* is an example of an "AC current" and the AC current generated by the AC generation circuit 42*b* is an example of a "second AC current."

As shown in (a) of FIG. 11, in the case of the configuration in which the two batteries 30 are combined, the AC generation circuit 42*a* is connected to one battery 30*a*, and the AC generation circuit 42*b* is connected to the other battery 30*b*. Also, the controller 44 outputs a control signal to a switch provided in each AC generation circuit 42 so that the phase of the AC current generated by each AC generation circuit 42 is shifted by 180°. In (a) of FIG. 11, an example of a voltage measurement position and an electric current flow direction changed in each AC generation circuit 42 by the controller 44 controlling each switch according to a control signal is shown. More specifically, a voltage V1-V0 between the two electrodes of the battery 30*a* (including inductance Laa), a current I-C10*a* flowing through the capacitor C10*a*, a current I-C20*a* flowing through the capacitor C20*a*, and a current I-Ela flowing through the battery 30*a* (including the inductance Laa) are shown as an example of a voltage and a current corresponding to the AC generation circuit 42*a*. Furthermore, a voltage V2-V1 between the two electrodes of the battery 30*b* (including inductance Lab), a current I-C10*b* flowing through the capacitor C10*b*, a current I-C20*b* flowing through the capacitor C20*b*, and a current I-E1*b* flowing through the battery 30*b* (including the inductance Lab) are shown as an example of a voltage and a current corresponding to the AC generation circuit 42*b*. Also, in (a) of FIG. 11, as a total voltage obtained by combining the battery 30*a* and the battery 30*b*, a voltage V2-V0 between two ends that are one end (V0) of the negative electrode side of the battery 30*a* in the AC generation circuit 42*a* and one end (V2) of the positive electrode side of the battery 30*b* in the AC generation circuit 42*b* is shown.

In (b) of FIG. 11, an example of changes in a control signal CS for controlling each AC generation circuit 42 in the controller 44 and currents and voltages in the AC generation circuit 42*a* and the AC generation circuit 42*b* is shown. In (b) of FIG. 11, it is assumed that the controller 44 sets the corresponding switch in the conductive state by setting each control signal CS at a "High" level and sets the corresponding switch in the non-conductive state by setting each control signal CS at a "Low" level. In the AC generation circuit 42, as described above, the resonant frequency ωs of the case where the capacitor C10 and the capacitor C20 are connected in series is the same as the resonant frequency ωp of the case where the capacitor C10 and the capacitor C20 are connected in parallel. Thus, in (b) of FIG. 11, the controller 44 outputs a control signal CS to each switch at a duty ratio of 50%. As described above, the controller 44 may provide a dead time for setting all switches in the non-conductive state between a period in which the switch is set in the conductive state and a period in which the switch is set in the non-conductive state. In (a) of FIG. 11, a case where the controller 44 provides a dead time to control each switch is shown. However, in the following description, detailed description of the dead time will be omitted for ease of description. That is, a case equivalent to a case where the controller 44 controls each switch without providing a dead time will be described.

In (b) of FIG. 11, an example of changes in the voltage V1-V0, the current I-C10*a*, and the current I-C20*a*, and the current I-Ela changed by the controller 44 controlling a control signal CS11*a*, a control signal CS21*a*, and a control signal CS22*a* with respect to the AC generation circuit 42*a* is shown. Furthermore, in (b) of FIG. 11, an example of changes in the voltage V2-V1, the current I-C10*b*, and the current I-C20*b*, and the current I-E1*b* changed by the controller 44 controlling a control signal CS11*b*, a control signal CS12*b*, and a control signal CS22*b* with respect to the AC generation circuit 42*b* is shown. In (b) of FIG. 11, an example of a change in the voltage V2-V0 is also shown.

As shown in (b) of FIG. 11, in a period P1, the controller 44 sets the control signal CS11*a* and the control signal CS21*a* of the AC generation circuit 42*a* at the "Low" level and sets the control signal CS12*a* and the control signal CS22*a* at the "High" level. Thereby, in the AC generation circuit 42*a*, the capacitor C10*a* and the capacitor C20*a* are connected in series with the battery 30*a* and the current I-C10*a* and the current I-C20*a* flow from the negative region to the positive region, such that the current I-Ela mainly flows in the negative region. Thereby, the voltage V1-V0 of the AC generation circuit 42*a* increases from a negative peak voltage to a positive peak voltage. On the other hand, in the period P1, the controller 44 sets the control signal CS11*b* and the control signal CS21*b* of the AC generation circuit 42*b* at the "High" level and sets the control signal CS12*b* and the control signal CS22*b* at the "Low" level. Thereby, in the AC generation circuit 42*b*, the capacitor C10*b* and the capacitor C20*b* are connected in parallel to the battery 30*a* and the current I-C10*b* and the current I-C20*b* mainly flow in the positive region, such that the current I-E1*b* also mainly flows in the positive region. Thereby, the voltage V2-V1 of the AC generation circuit 42*b* decreases from the positive peak voltage to the negative peak voltage.

Subsequently, as shown in (b) of FIG. 11, in a period P2, the controller 44 sets the control signal CS11*a* and the control signal CS21*a* of the AC generation circuit 42*a* at the "High" level and sets the control signal CS12*a* and the control signal CS22*a* at the "Low" level. Thereby, in the AC generation circuit 42*a*, the capacitor C10*a* and the capacitor C20*a* are connected in parallel to the battery 30*a* and the current I-C10*a* and the current I-C20*a* mainly flow in the positive region, such that the current I-Ela also mainly flows in the positive region. Thereby, the voltage V1-V0 of the AC generation circuit 42*a* decreases from the positive peak voltage to the negative peak voltage. On the other hand, in the period P2, the controller 44 sets the control signal CS11*b* and the control signal CS21*b* of the AC generation circuit 42*b* at the "Low" level and sets the control signal CS12*b* and the control signal CS22*b* at the "High" level. Thereby, in the AC generation circuit 42*b*, the capacitor C10*b* and the capacitor C20*b* are connected in series with the battery 30*a* and the current I-C10*b* and the current I-C20*b* flow from the negative region to the positive region, such that the current I-E1*b* mainly flows in the negative region. Thereby, the voltage V2-V1 of the AC generation circuit 42*b* increases from the negative peak voltage to the positive peak voltage.

In this way, as described above, the controller 44 outputs the control signals CS so that the phases of the AC currents generated by the AC generation circuits 42 are shifted by 180° from each other. Thereby, the current I-C10*a* and the current I-C20*a* or the current I-Ela flowing in the AC generation circuit 42*a* are shifted by 180° from the current I-C10*b* and the current I-C20*b* or the current I-E1*b* flowing in the AC generation circuit 42*b*. Thereby, the phases of both the voltage V1-V0 of the AC generation circuit 42*a* and the voltage V2-V1 of the AC generation circuit 42*b* are also shifted by 180° from each other.

Thus, in the temperature raising device 40, the controller 44 outputs a control signal CS having a duty ratio of 50% to each switch and the connection between the capacitor C10 and the capacitor C20 to the battery 30 is switched to the series connection or the parallel connection. Thereby, as shown in (b) of FIG. 11, the voltage V2-V0 becomes a sum of the voltage V1-V0 of the AC generation circuit 42*a* and the voltage V2-V1 of the AC generation circuit 42*b*. Moreover, as can be seen from the waveform of the voltage V2-V0 shown in (a) of FIG. 11, the voltage waveform has voltage fluctuation (so-called voltage waveform ripple) that is less than that of the voltage V2-V0 in the temperature raising device 40C shown in FIG. 10. This is because an electric current waveform of the AC current (the current I-Ela or the current I-E1*b*) generated by each AC generation circuit 42 in the temperature raising device 40 is closer to a waveform of a sinusoidal wave than an electric current waveform of the AC current (the current I-Ela or the current I-E1*b*) generated by each AC generation circuit 42 in the temperature raising device 40C shown in FIG. 10.

[Alternative Operation of Temperature Raising Device]

Figure 12:
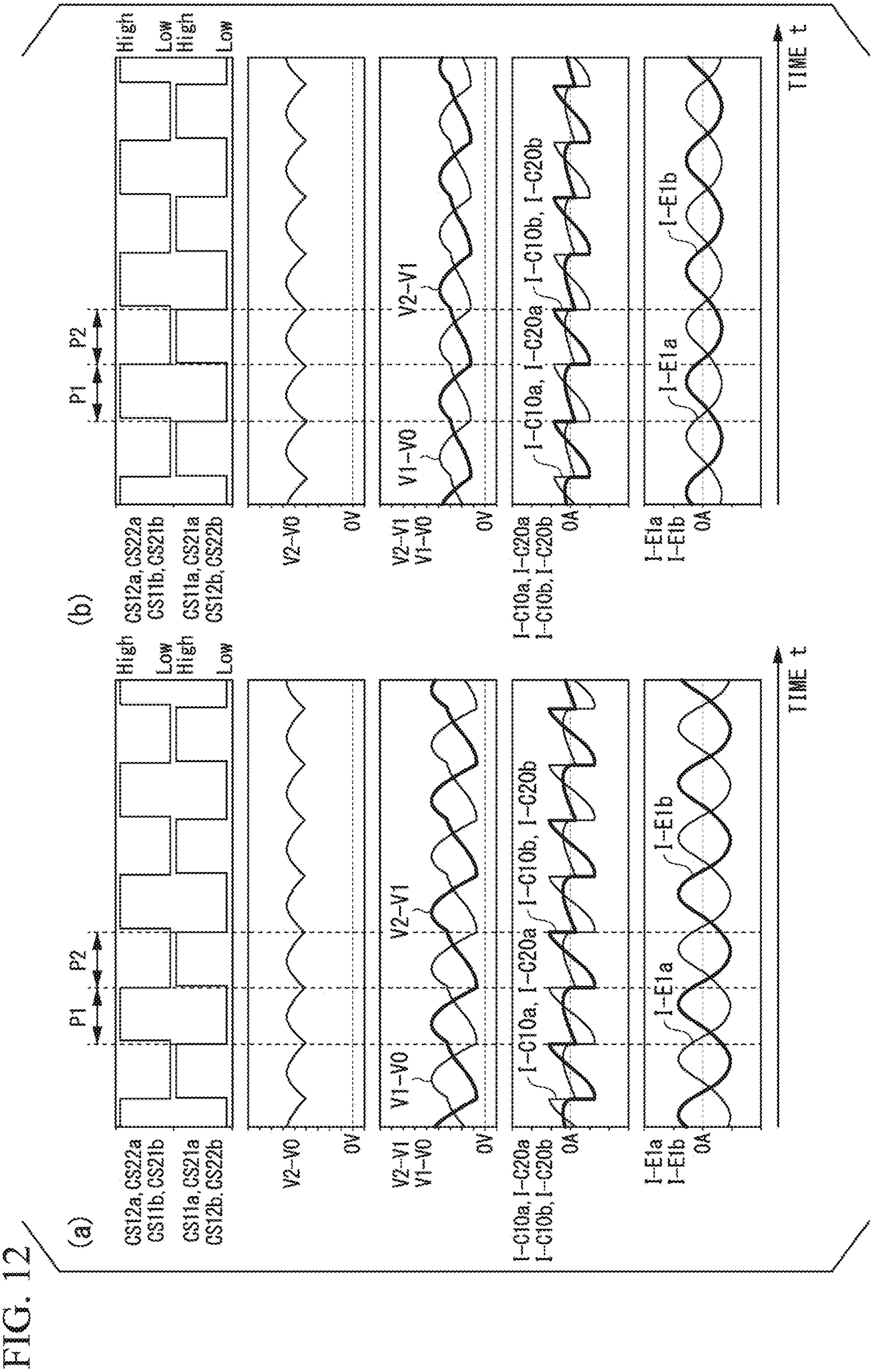
FIG. 12 is a diagram showing another example of operating waveforms of the temperature raising device adopting the AC generation circuit of the embodiment.

FIG. 12 is a diagram showing another example of the operating waveform (the simulation waveform) of the temperature raising device 40 adopting the AC generation circuit 42 of the embodiment. (a) of FIG. 12 is an example in which a relationship between the capacitance Cx and the capacitance Cy in the configuration shown in (a) of FIG. 11 is based on the following Eq. (63) and (b) of FIG. 12 is an example in which a relationship between the capacitance Cx and the capacitance Cy in the configuration shown in (a) of FIG. 11 is based on the following Inequality (64). In FIG. 12, as in the example shown in FIG. 11, the resonant frequency ω of the AC current generated in the AC generation circuit 42 is also set to 200 [kHz]. Thus, even in the example shown in FIG. 12, the resonant frequency ω1 is kept at 200 [kHz] by appropriately adjusting the inductance component Ls, the inductance Lx, the capacitance Cx, and the capacitance Cy on the basis of a relational equation represented by the above Eq. (59).

$$Cy=Cx \tag{63}$$

$$Cy>Cx \tag{64}$$

In the example shown in FIG. 12, as in the example shown in FIG. 11, the controller 44 outputs a control signal CS to each switch at a duty ratio of 50%. As can be seen by comparing the example shown in (b) of FIG. 11 with the examples shown in (a) of FIG. 12 and (b) of FIG. 12, the voltage V1-V0, the voltage V2-V1, the current I-C10*a*, the current I-C20*a*, the current I-C10*b*, the current I-C20*b*, the current I-Ela, and the current I-E1*b* have different amplitudes, but changes therein are similar. Thus, the control of the AC generation circuit 42 by the controller 44 and the operation of each AC generation circuit 42 in the example shown in (a) of FIG. 12 and (b) of FIG. 12 can be taken into account like the control of the AC generation circuit 42 by the controller 44 and the operation of the AC generation circuit 42 described with reference to FIG. 11. Accordingly, a detailed description regarding the control of the AC generation circuit 42 by the controller 44 and the operation of each AC generation circuit 42 in the example shown in (a) of FIG. 12 and (b) of FIG. 12 will be omitted.

Thus, when a configuration in which two batteries 30 (here, the battery 30*a* and the battery 30*b*) are combined is adopted for the battery 30 mounted in the vehicle 1 in the temperature raising device 40, the controller 44 outputs a control signal CS having a duty ratio of 50% to each switch and the connection between the capacitor C10 and the capacitor C20 to the battery 30 is switched to the series connection or the parallel connection. In other words, the controller 44 performs a control process by shifting the phase of the control signal CS by a prescribed phase (here, shifting the phase by 180°) and outputting the control signal CS having the shifted phase so that the AC generation circuit 42 corresponding to each battery 30 operates in the opposite direction. Thereby, as shown in (b) of FIG. 11, (a) of FIG. 12, and (b) of FIG. 12, the AC generation circuit 42 can reduce the fluctuation of the total voltage V2-V0 obtained by combining the two batteries 30. In other words, the AC generation circuit 42 can generate an AC current in which the harmonic component is reduced and reduce noise emitted when the temperature of the battery 30 is raised. From this, the AC generation circuit 42 is more applicable as a configuration in which the temperature is raised by applying an AC current to each battery 30 (or causing an AC current to flow through each battery 30) when a configuration in which two batteries 30 are combined is adopted for the battery 30 mounted in the vehicle 1 and in which the fluctuation in the total voltage (so-called voltage waveform ripple) output by the set of the two batteries 30 is reduced.

As described above, according to the temperature raising device 40 of the embodiment, the AC generation circuit 42 includes a capacitor C10, a capacitor C11, a capacitor C20, a capacitor C21, a switch S11, a switch S12, a switch S21, a switch S22, a switch S22, an inductor L10, and an inductor L20. In the temperature raising device 40 of the embodiment, by switching the connection of the capacitor C10 and the capacitor C20 provided in the AC generation circuit 42 to the battery 30 to the series connection or the parallel connection, an AC current based on electric power stored in the battery 30 is generated using a resonant operation in which the energy is alternately switched between the magnetic energy stored in the inductance La of the battery 30 and the electrostatic energy stored in at least the capacitor C10. At this time, the AC generation circuit 42 of the embodiment makes an adjustment so that the total impedance of the AC generation circuit 42 is similar according to the components of the capacitor C11, the capacitor C21, the inductor L10, and the inductor L20 and generates AC currents of the same resonant frequency ω in the cases where the capacitor C10 and the capacitor C20 are connected in series with and in parallel to the battery 30. Thereby, in the temperature raising device 40 of the embodiment, the electric current waveform of the AC current generated by each AC generation circuit 42 becomes an electric current waveform closer to a waveform of a sinusoidal wave. Thereby, in the temperature raising device 40 of the embodiment, the temperature of the battery 30 can be more efficiently raised by an AC current having an electric current waveform close to a waveform of a sinusoidal wave generated by the AC generation circuit 42. Thereby, in the vehicle 1 in which the temperature raising device 40 of the embodiment is adopted, the battery 30 can be used in a state in which the temperature is raised to a suitable temperature and the decrease in the charging/discharging performance of the battery 30 can be suppressed. Furthermore, in the vehicle 1 in which the temperature raising device 40 of the embodiment is adopted, because the harmonic component included in the AC current generated by the AC generation circuit 42 is small, noise emitted when the temperature of the battery 30 is raised can be reduced.

Meanwhile, in the above description, in the temperature raising device 40 of the above-described embodiment, it is assumed that the capacitances Cx of the capacitor C10 and the capacitor C20 provided in the AC generation circuit 42 are equal, the capacitances Cy of the capacitor C11 and the capacitor C21 are equal, and the inductances Lx of the inductor L10 and the inductor L20 are equal. Also, in the above description, it is assumed that the inductance component of the inductance La provided in the battery 30 is an inductance component Ls, and the capacitance or inductance of each component is adjusted (determined) on the basis of a relational equation represented by the above Eq. (59). However, it is assumed that, in relation to the capacitance or inductance of each component, there are also variations in characteristics between the same components. Furthermore, it is assumed that the wiring portion connecting the AC generation circuit 42 and the battery 30 also includes an inductance component. Thus, in the temperature raising device 40 of the embodiment, the capacitance or inductance of each component provided in the AC generation circuit 42 may have a value in consideration of the variations in the characteristics of each component, the variation in the inductance component Ls of the inductance La provided in the battery 30, and the inductance component included in the wiring portion for connecting the AC generation circuit 42 and the battery 30. That is, in the temperature raising device 40 of the embodiment, in the range in which the electric current waveform of the AC current generated by the AC generation circuit 42 can be regarded as a waveform of a sinusoidal wave (a range in which a substantial effect can be obtained), a certain range may be provided for a value of the capacitance Cx of each of the capacitor C10 and the capacitor C20, the capacitance Cy of each of the capacitor C11 and the capacitor C21, or the inductance Lx of each of the inductor L10 and the inductor L20. In other words, in the temperature raising device 40 of the embodiment, it is only necessary to set a value in a range in which it can be said that the capacitances Cx of the capacitors C10 and C20 provided by the AC generation circuit 42 are equal, the capacitances Cy of the capacitors C11 and C21 are equal, and the inductances Lx of the inductors L10 and L20 are equal.

In the temperature raising device 40 of the above-described embodiment, a case where the duty ratio of the control signal CS output to each switch by the controller 44 is 50% has been described. However, as described above, the controller 44 may control the switch by providing a dead time when all switches are in the non-conductive state between the period in which the switch is set in the conductive state and the period in which the switch is set in the non-conductive state. For example, in the temperature raising device 40 of the embodiment, the controller 44 may switch the connection of the capacitor C10 and the capacitor C20 to the battery 30 from the parallel connection to the series connection or vice versa by providing the duty ratio of the control signal CS output to each switch to a value that can be regarded as approximately 50% (for example, a prescribed value between 45% and 55%) and outputting the control signal CS to each switch.

According to the temperature raising device 40 of the embodiment described above, the AC generation circuit 42 for raising a temperature of the battery 30 by generating an AC current based on electric power stored in the battery 30 having the inductance La includes the capacitor C10 having a first end connected to a positive electrode side of the battery 30; the capacitor C11 having a first end connected to a second end of the capacitor C10 and a second end connected to a negative electrode side of the battery 30; the capacitor C20 having a second end connected to the negative electrode side of the battery 30; the capacitor C21 having a second end connected to a first end of the capacitor C20 and a first end connected to the positive electrode side of the battery 30; the switch S11 having a first terminal connected to the first end of the capacitor C10; the switch S12 having a first terminal connected to a second terminal of the switch S11 and a second terminal connected to the second end of the capacitor C10; the switch S21 having a second terminal connected to the second end of the capacitor C20; the switch S22 having a second terminal connected to a first terminal of the switch S21 and a first terminal connected to the first end of the capacitor C20; the inductor L10 connected between the second terminal of the switch S11 and the first terminal of the switch S22; and the inductor L20 connected between the second terminal of the switch S12 and the first terminal of the switch S21, such that it is possible to more efficiently raise the temperature of the battery 30 for traveling mounted in the vehicle 1. Thereby, in the vehicle 1 in which the temperature raising device 40 of the embodiment is adopted, the battery 30 can be used in a state in which the temperature is raised to a suitable temperature, and the decrease in the charging/discharging performance of the battery 30 can be suppressed. Thereby, in the vehicle 1 in which the temperature raising device 40 of the embodiment is mounted, the marketability of the vehicle 1 such as the improvement of durability can be enhanced. From these, the vehicle 1 in which the temperature raising device 40 of the embodiment is mounted is expected to contribute to improving energy efficiency and reducing adverse effects on the global environment.

In each of the above-described embodiments, a configuration in which the control device 100 controls the activation or stopping of the temperature raising device 40 and the controller 44 controls each switch provided in the AC generation circuit 42 such that the switch is in the conductive state or the non-conductive state has been described. The operation of the controller 44 may be implemented when a hardware processor such as a CPU provided in the controller 44 executes a program. The function of the control device 100 may include the function of the controller 44 described above. In this case, the controller 44 may be omitted in the temperature raising device 40.

Although modes for carrying out the present invention have been described using embodiments, the present invention is not limited to the embodiments and various modifications and substitutions can also be made without departing from the scope and spirit of the present invention.

What is claimed is:

1. An alternating current (AC) generation circuit for raising a temperature of a power storage by generating an AC current based on electric power stored in the power storage having an inductance component, the AC generation circuit comprising:

- a first capacitor having a first end connected to a positive electrode side of the power storage;
- a second capacitor having a first end connected to a second end of the first capacitor and a second end connected to a negative electrode side of the power storage;
- a third capacitor having a second end connected to the negative electrode side of the power storage;
- a fourth capacitor having a second end connected to a first end of the third capacitor and a first end connected to the positive electrode side of the power storage;
- a first switch having a first terminal connected to the first end of the first capacitor;
- a second switch having a first terminal connected to a second terminal of the first switch and a second terminal connected to the second end of the first capacitor;
- a third switch having a second terminal connected to the second end of the third capacitor;
- a fourth switch having a second terminal connected to a first terminal of the third switch and a first terminal connected to the first end of the third capacitor;
- a first inductor connected between the second terminal of the first switch and the first terminal of the fourth switch; and
- a second inductor connected between the second terminal of the second switch and the first terminal of the third switch,
- wherein the first switch and the third switch are controlled to be in a conductive state or a non-conductive state in accordance with a first control signal,
- wherein the second switch and the fourth switch are controlled to be in the conductive state or the non-conductive state in accordance with a second control signal, and
- wherein a period of a first state in which the first control signal causes the first switch and the third switch to be in the conductive state does not overlap a period of a second state in which the second control signal causes the second switch and the fourth switch to be in the conductive state.

2. The AC generation circuit according to claim 1, wherein an inductance of the first inductor, an inductance of the second inductor, a capacitance of the first capacitor, a capacitance of the second capacitor, a capacitance of the third capacitor, and a capacitance of the fourth capacitor are adjusted so that an electric current waveform of the AC current is close to a waveform of a sinusoidal wave on the basis of a relational expression including the inductance component.

3. The AC generation circuit according to claim 2, wherein the inductance of the first inductor is the same as the inductance of the second inductor.

4. The AC generation circuit according to claim 3, wherein the capacitance of the first capacitor and the capacitance of the third capacitor are the same as first capacitance.

5. The AC generation circuit according to claim 4, wherein the capacitance of the second capacitor and the capacitance of the fourth capacitor are the same as a second capacitance.

6. The AC generation circuit according to claim 5, wherein the second capacitance is less than capacitance that is twice the first capacitance.

7. The AC generation circuit according to claim 5, wherein the second capacitance is greater than capacitance that is three times the first capacitance.

8. The AC generation circuit according to claim 5, wherein the second capacitance is the same as the first capacitance.

9. The AC generation circuit according to claim 1, wherein the inductance component includes an inductance component provided in a wiring portion between the power storage and the AC generation circuit.

10. The AC generation circuit according to claim 1,

- wherein the power storage includes a first power storage and a second power storage connected in series with the first power storage,
- wherein the AC generation circuit is connected to the first power storage,
- wherein a second AC generation circuit having the same configuration as the AC generation circuit is connected to the second power storage, and
- wherein the first control signal and the second control signal are input so that a prescribed phase difference is given between an AC current generated by the AC generation circuit and a second AC current that is an AC current generated by the second AC generation circuit.

11. A temperature raising device comprising:

the AC generation circuit according to claim 10; and a controller configured to output the first control signal and the second control signal and alternately switch the state between the first state in which the first switch and the third switch are allowed to be in the non-conductive state and the second switch and the fourth switch are allowed to be in the conductive state and the second state in which the first switch and the third switch are allowed to be in the conductive state and the second switch and the fourth switch are allowed to be in the non-conductive state according to the first control signal and the second control signal.

* * * * *